(12) United States Patent
Göres et al.

(10) Patent No.: US 9,052,907 B2
(45) Date of Patent: Jun. 9, 2015

(54) SELECTIVE CHANGE PROPAGATION TECHNIQUES FOR SUPPORTING PARTIAL ROUNDTRIPS IN MODEL-TO-MODEL TRANSFORMATIONS

(75) Inventors: Jürgen Göres, Kaiserslautern (DE); Martin Kolesár, Spišská Nová Ves (SK)

(73) Assignee: Software AG, Darmstadt (DE)

( * ) Notice: Subject to any disclaimer, the term of this patent is extended or adjusted under 35 U.S.C. 154(b) by 385 days.

(21) Appl. No.: 13/280,960

(22) Filed: Oct. 25, 2011

(65) Prior Publication Data
US 2013/0104099 A1 Apr. 25, 2013

(51) Int. Cl.
*G06F 9/44* (2006.01)
*G06Q 10/06* (2012.01)

(52) U.S. Cl.
CPC ............... *G06F 8/355* (2013.01); *G06F 8/10* (2013.01); *G06Q 10/06* (2013.01)

(58) Field of Classification Search
USPC ......................................................... 717/104
See application file for complete search history.

(56) References Cited

U.S. PATENT DOCUMENTS

| | | | |
|---|---|---|---|
| 6,973,638 B1 | 12/2005 | Gangopadhyay et al. | |
| 7,206,751 B2 | 4/2007 | Hack et al. | |
| 7,222,302 B2 | 5/2007 | Hauser et al. | |
| 7,280,973 B1 | 10/2007 | Hack et al. | |
| 7,370,315 B1 | 5/2008 | Lovell et al. | |
| 7,542,980 B2 * | 6/2009 | Tsyganskiy et al. | ................ 1/1 |
| 7,680,800 B2 | 3/2010 | Claussen et al. | |
| 7,703,071 B2 | 4/2010 | Kuester et al. | |
| 7,921,409 B2 | 4/2011 | Shepard et al. | |
| 7,949,619 B2 | 5/2011 | Narayanaswamy et al. | |
| 8,250,234 B2 | 8/2012 | Allen et al. | |
| 8,281,324 B2 | 10/2012 | Kaehler et al. | |
| 8,694,465 B2 * | 4/2014 | O'Farrell et al. | ............ 707/621 |
| 8,719,317 B1 | 5/2014 | Crain | |
| 8,756,259 B1 | 6/2014 | Crain | |
| 2005/0119871 A1 * | 6/2005 | Deffler | .......................... 703/22 |

(Continued)

OTHER PUBLICATIONS

C. Batini et al., "A Comparative Analysis of Methodologies for Database Schema Integration," ACM Computing Surveys, vol. 18, No. 4, pp. 323-364, Dec. 1986.

(Continued)

*Primary Examiner* — John Chavis
(74) *Attorney, Agent, or Firm* — Nixon & Vanderhye PC

(57) ABSTRACT

Certain example embodiments relate to selective change propagation techniques for supporting partial roundtrips in model-to-model transformations. In certain example embodiments, enablement checking is performed to determine whether a propagation operation can be performed for an object. If the object passes enablement checking, the propagation is executed by, for example, creating the object(s) in a business-oriented (e.g., EPC) model; updating relevant internal attributes of technical (e.g., BPMN) objects that allow for the successful merge; optionally correcting user-introduced errors in the technical model; and properly connecting the pulled-up objects with their surroundings. The connecting is performed so that the objects advantageously appear as if the current business-oriented model was used for the merge. According to certain example embodiments, the connecting may be deterministic, e.g., such that the result will be the same regardless of order or sequence in which the propagations are made.

43 Claims, 23 Drawing Sheets

(56) References Cited

U.S. PATENT DOCUMENTS

| | | |
|---|---|---|
| 2005/0216917 A1 | 9/2005 | Krishnaswamy et al. |
| 2006/0101423 A1 | 5/2006 | Aharoni et al. |
| 2006/0293941 A1 | 12/2006 | Ivanov et al. |
| 2007/0005618 A1 | 1/2007 | Ivanov et al. |
| 2007/0038501 A1 | 2/2007 | Lee et al. |
| 2007/0073785 A1* | 3/2007 | Laird .......................... 707/201 |
| 2007/0118551 A1 | 5/2007 | Akkiraju et al. |
| 2007/0174795 A1 | 7/2007 | Lavagno et al. |
| 2007/0179821 A1 | 8/2007 | Poetsch et al. |
| 2007/0226681 A1* | 9/2007 | Thorup ........................ 717/104 |
| 2007/0245297 A1 | 10/2007 | Kuester et al. |
| 2007/0261040 A1 | 11/2007 | Ogilvie et al. |
| 2007/0266377 A1 | 11/2007 | Ivanov |
| 2008/0015911 A1 | 1/2008 | Wang et al. |
| 2008/0229275 A1 | 9/2008 | Weber |
| 2008/0255997 A1 | 10/2008 | Bluhm et al. |
| 2008/0263510 A1* | 10/2008 | Nerome et al. ............... 717/104 |
| 2009/0006150 A1 | 1/2009 | Prigge et al. |
| 2009/0007056 A1 | 1/2009 | Prigge et al. |
| 2009/0024558 A1 | 1/2009 | Brethauer et al. |
| 2009/0138425 A1 | 5/2009 | Narayanaswamy et al. |
| 2009/0150125 A1 | 6/2009 | Elaasar |
| 2009/0172632 A1 | 7/2009 | Kashai et al. |
| 2009/0198481 A1 | 8/2009 | Narayanaswamy et al. |
| 2009/0198533 A1 | 8/2009 | Narayanaswamy et al. |
| 2009/0198639 A1 | 8/2009 | Narayanaswamy et al. |
| 2009/0265684 A1* | 10/2009 | Fuchs et al. ................... 717/105 |
| 2011/0145707 A1 | 6/2011 | Gschwind et al. |
| 2011/0161931 A1* | 6/2011 | Camelon et al. .............. 717/121 |
| 2012/0030573 A1 | 2/2012 | Balko et al. |

OTHER PUBLICATIONS

Susan Davidson et al., "Semantics of Database Transformations," University of Pennsylvania Scholarly Commons, Database Research Group (CIS), 2008. [online] [retrieved Oct. 25, 2011]. http://repository.upenn.edu/db_research/20/.

Rachel A. Pottinger et al., "Merging Models Based on Given Correspondences," Proceedings of the 29$^{th}$ VLDB Conference, Berlin, Germany, 2003. [online] [retrieved Oct. 6, 2011]. http://www.cs.ubc.ca/~rap/publications/pottinger-bernstein-vldb03.pdf.

Erhard Rahm et al., "A Survey of Approaches to Automatic Schema Matching," The VLDB Journal 10, pp. 334-350, 2001.

Phillip A. Bernstein et al., "A Vision for Management of Complex Models." [online] [retrieved Oct. 6, 2011]. http://db.cs.washington.edu/papers/sigmodrecord.pdf.

DeveloperWorks. Comparing and Merging UML Models in IBM Rational Software Architect: Part 1—Comparing Models with Local History. [online] [retrieved Oct. 6, 2011]. http://www.ibm.com/developerworks/rational/library/05/712_comp/.

DeveloperWorks. Comparing and Merging UML Models in IBM Rational Software Architect: Part 2—Merging Models Using "Compare with Each Other." [online] [retrieved Oct. 24, 2011]. http://www.ibm.com/developerworks/rational/library/05/712_comp2/.

OMG Unified Modeling Language (OMG UML), Superstructure, V2.1.2, Nov. 2007. [online] [Oct. 6, 2011]. http://www.omg.org/spec/UML/2.1.2/Superstructure/PDF/.

David S. Frankel, "Model Driven Architecture: Applying MDA to Enterprise Computing," Copyright 2003.

Richard Soley et al., "Model Driven Architecture," Object Management Group, 2000.

Dr. Gsvp Raju et al., "Roundtrip Engineering Using Unified Modeling Language with Rational Rose and JAVA," International Journal of Computer Applications, vol. 10, No. 10, Nov. 2010, pp. 28-34.

IBM Redbooks—Round-trip Engineering with Rational XDE. [online] [retrieved Oct. 25, 2011]. http://www.redbooks.ibm.com/abstracts/tips0219.html?open.

Stefan Dessloch et al., "Orchid: Integrating Schema Mapping and ETL," Proceedings of the 2008 International Conference of Data Engineering (ICDE), pp. 1307-1316. [online] [retrieved Oct. 25, 2011]. http://disi.unitn.it/~p2p/RelatedWork/Matching/orchid.pdf.

Oracle Business Process Analysis Suite—Oracle Data Sheet. [online] [retrieved Oct. 25, 2011]. www.oracle.com/us/technologies/bpm/038674.pdf.

IBM Rational Software Architect—Overview. [online] [retrieved Oct. 25, 2011]. http://www-01.ibm.com/software/rational/products/swarchitect/.

IBM Rational Software Architect—Features. [online] [retrieved Oct. 25, 2011]. http://www-01.ibm.com/software/rational/products/swarchitect/features/?S_CMP=wspace.

U.S. Appl. No. 13/024,646, filed Feb. 10, 2011, Göres.

A.W. Scheer, "ARIS—Business Process Modeling," Third Edition, Copyright Springer 2000.

Jürgen Göres, "A Model Management Framework for Information Integration," Dissertation Nov. 27, 2009.

Nedo Balaban et al., "Business Process Performance Management: Theoretical and Methodological Approach and Implementation," Management Information Systems, Feb. 15, 2011. http://www.ef.uns.ac.rs/mis/archive-pdf/2011%20-%20No4/MIS2011_4_1.pdf.

Sandy Kemsley, "Business & IT: Sharing the Vision of Enterprise BPM," Software AG WebMethods ARIS Platform, May 31, 2011. http://www.softwareag.com/tr/Images/sec_SAG_ARIS-wM_BusIT_WP_May11-web_tcm70-80009.pdf.

Tom Mens et al., "A Taxonomy of Model Transformation," Elsevier, Electronic Notes in Theoretical Computer Science, vol. 152, Mar. 27, 2006.

Nantes et al., "ATL: Atlas Transformation Language," ATL Starter's Guide, Version 0.1, Dec. 2005, pp. 1-23. http://www.eclipse.org/atl/documentation/old/ATL_Starter_Guide.pdf.

Nantes et al., "ATL: Atlas Transformation Language," ATL User Manual, Version 0.7, Feb. 2006, pp. 1-95. http://www.eclipse.org/atl/documentation/old/ATL_User_Manual[v0.7].pdf.

Wikipedia—QVT, retrieved Jan. 16, 2015, pp. 1-5. http://en.wikipedia.org/wiki/QVT.

Murzek et al., "Structural Patterns for the Transformation of Business Process Models," Accepted at the International Workshop on Models for Enterprise Computing (IWMEC 2006) at the 10$^{th}$ IEEE International EDOC Conference (EDOC 2006), The Enterprise Computing Conference, Hong Kong, Oct. 2006, pp. 1-10. http://publik.tuwien.ac.at/files/pub-inf_3809.pdf.

Murzek et al., "Business Process Model Transformation Issues—The Top 7 Adversaries Encountered at Defining Model Transformations," Conference Paper at the 9$^{th}$ International Conference on Enterprise Information Systems ICEIS 2007, Funchal, Madeira-Portugal, Jun. 2007, pp. 1-8. http://www.wit.at/people/murzek/publications/Murzek_Kramler_2006_ModTransIssues.pdf.

Murzek et al., "Defining Model Transformations for Business Process Models Graphically," Position Paper for Workshop—Enterprise Modeling and Ontology: Ingredients for Interoperability, at PAKM 2004, Vienna, VA, Dec. 2004, pp. 1-8. http://www.wit.at/people/murzek/publications/20041202-DefModTransGraph.pdf.

Andrews et al., "Business Process Execution Language for Web Services," May 5, 2003, Version 1.1, pp. 1-136. https://www.oasis-open.org/committees/download.php/2046/BPEL%20V1-1%20May%205%202003%20Final.pdf.

Christensen et al., "Web Services Description Language (WSDL) 1.1," Mar. 15, 2001, pp. 1-30. http://www.w3.org/TR/wsdl.

Bray et al., "Namespaces in XML," Jan. 14, 1999, pp. 1-12. http://www.w3.org/TR/1999/REC-xml-names-19990114/.

Thompson et al., "XML Schema Part 1: Structures Second Edition," Oct. 28, 2004, pp. 1-96. http://www.w3.org/TR/xmlschema-1/.

Van Der Aalst et al., "Workflow Patterns," Distributed and parallel Databases, Jul. 2003, vol. 144, No. 1, Springer Netherlands, The Netherlands, pp. 1-70. http://www.workflowpatterns.com/documentation/documents/wfs-pat-2002.pdf.

Wohed et al., "Pattern Based Analysis of BPEL4WS," Apr. 2002, QUT Technical Report FIT-TR-2002-04, Queensland University of Technology, Brisbane, Australia, pp. 1-20. http://xml.coverpages.org/AalstBPEL4WS.pdf.

Mendling et al., "Towards Workflow Pattern Support of Event-Driven Process Chains (EPC)," Proceedings of the 2$^{nd}$ GI-Workshop

(56) References Cited

OTHER PUBLICATIONS

XML4BPM, 2005, Karisruhe, Germany, pp. 1-15. http://sunsite.informatik.rwth-aachen.de/Publications/CEUR-WS//Vol-145/paper2.pdf.

OMG—Meta Object Facility (MOF) 2.0 Query/View/Transformation Specification, Version 1.0, Apr. 2008, pp. 1-240. http://www.omg.org/spec/QVT/1.0/PDF/.

Murzek et al., "Model Transformation in Practice Using the BOC Model Transformer," Paper for the Workshop Model Transformation in Practice at Models 2005, Montego Bay, Jamaica, Oct. 2005, pp. 1-31.

Stein et al., "EPK nach BPEL Transformation als Voraussetzung für praktische Umsetzung einer SOA," Mar. 2007, pp. 75-80 and English language translation (1 page).

Mendling et al., "Transformation Strategies Between Block-Oriented and Graph-Oriented Process Modelling Language," 2006, pp. 1-20. http://www.mendling.com/publications/TR05-Strategy.pdf.

Ask.com Search for "Transformation Strategies Between Block Oriented," retrieved Jan. 20, 2015, pp. 1-2. http://www.ask.com/web?q=transformation+strategies+between+block+oriented&qsrc=O.

* cited by examiner

| NCPA | RCPA | DCPA |
|---|---|---|
| 1. Enablement check | | |
| 2a. Creation of source model element(s) | 2b. Modification (and creation) of source model element(s) | 2c. Deletion of source model element(s) |
| 3. Updating of the trace information on the target model element(s) | | |
| 4. Optional correcting of modeling errors in the source and target models | | |
| | 5a. Connecting of added elements into the overall process flow | 5b. Connecting of neighborhood of deleted element |

Fig. 15

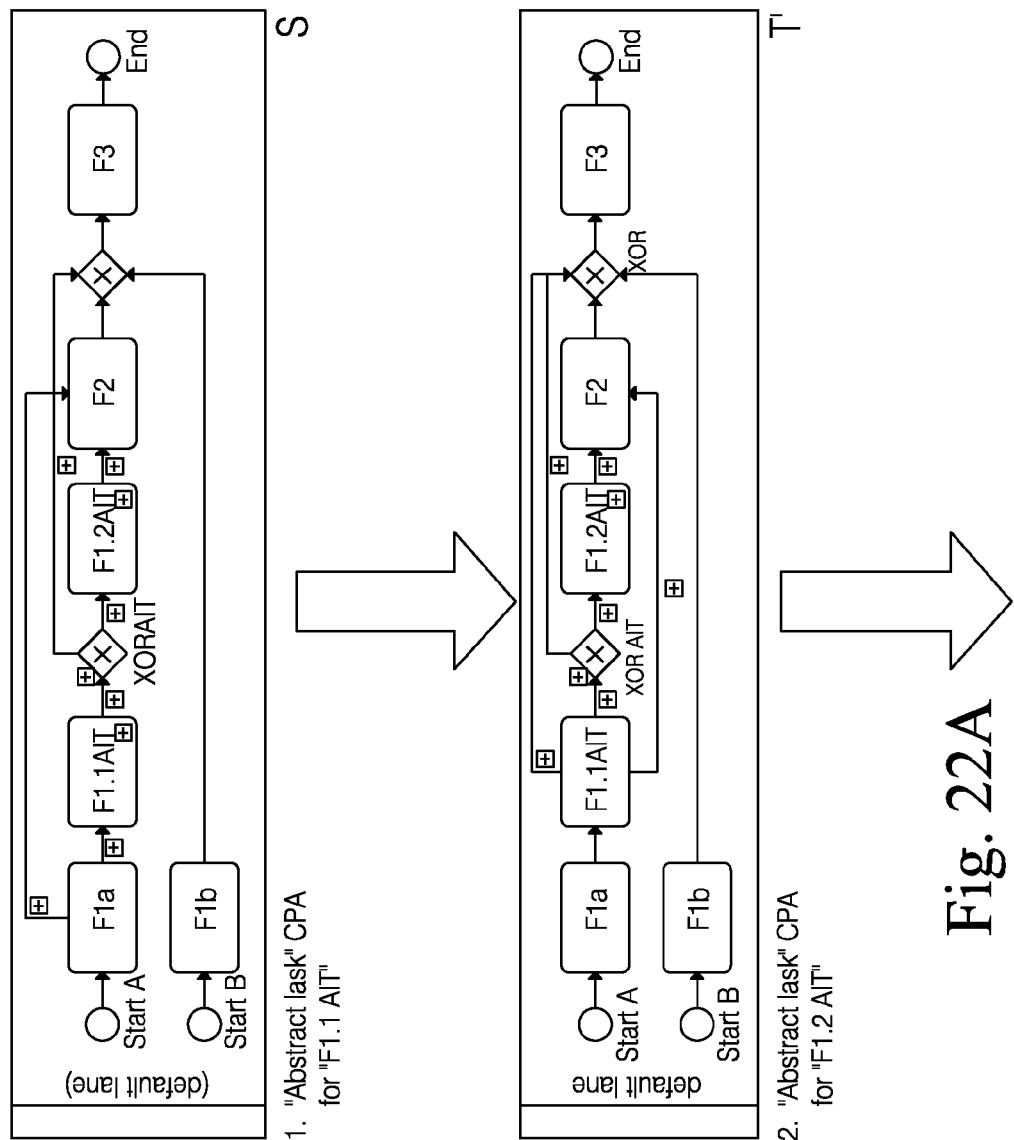
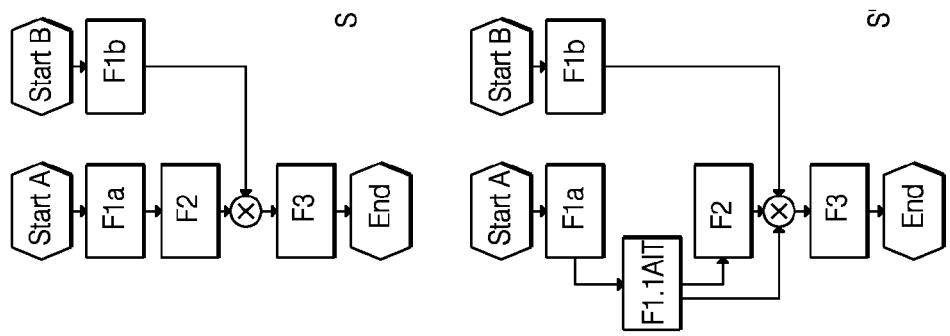
Fig. 22A

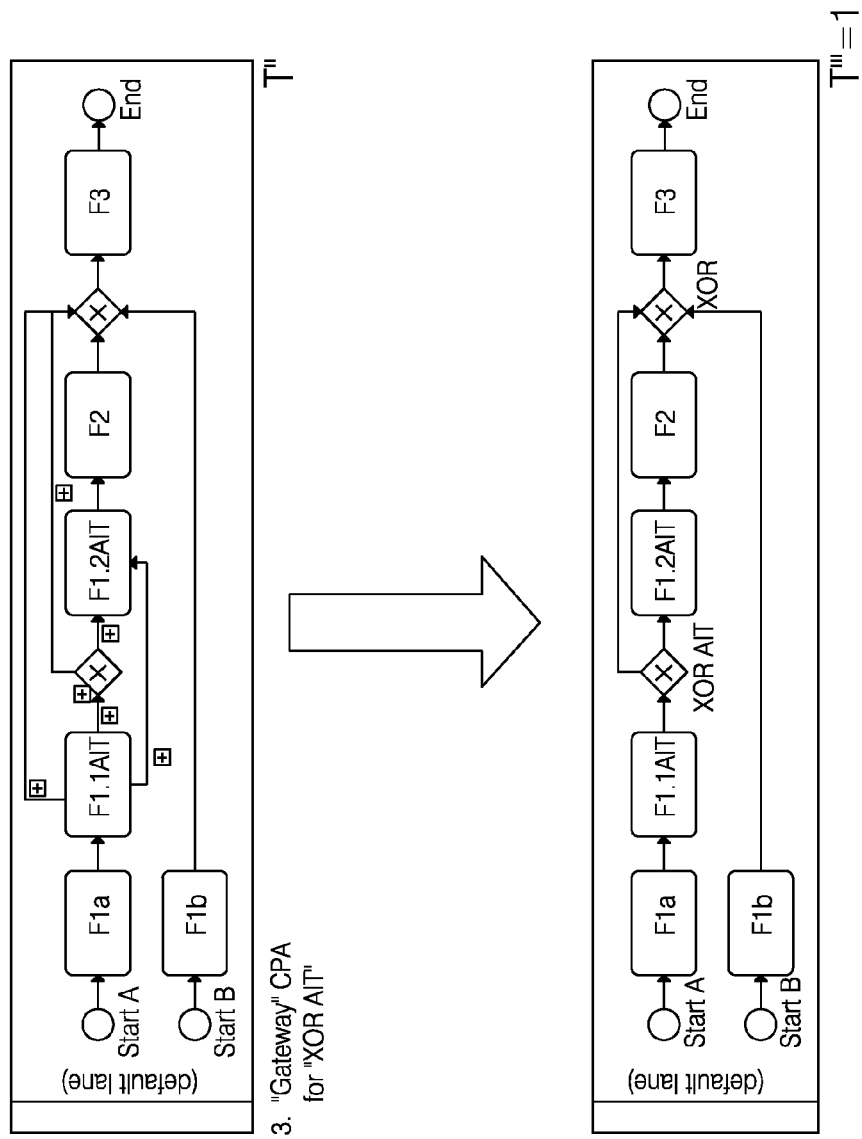
Fig. 22B
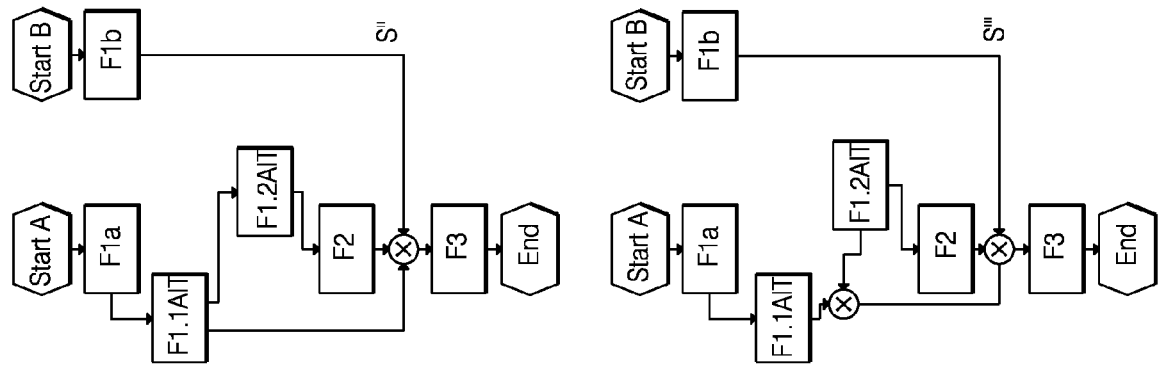

SELECTIVE CHANGE PROPAGATION TECHNIQUES FOR SUPPORTING PARTIAL ROUNDTRIPS IN MODEL-TO-MODEL TRANSFORMATIONS

FIELD OF THE INVENTION

Certain example embodiments described herein relate to selective change propagation techniques for supporting partial roundtrips in model-to-model transformations. More particularly, certain example embodiments described herein relate to performing propagation operations if objects pass initial enablement checks. In certain example embodiments, the propagation is executed by, for example, creating the object(s) in a business-oriented (e.g., EPC) model; updating relevant internal attributes of technical (e.g., BPMN) objects that allow for the successful merge; optionally correcting user-introduced errors in the technical model; and properly connecting the pulled-up objects with their surroundings.

BACKGROUND AND SUMMARY OF EXAMPLE EMBODIMENTS OF THE INVENTION

A "model" generally describes one or more complex application artifacts (e.g., business processes, data structures, structure and behavior of software systems or other technical and/or business components, etc.) in a formalized fashion. A model can use modeling primitives and/or conventions of a well-defined "abstract language," which oftentimes is referred to as a metamodel. Some common metamodels are the UML family of modeling languages (e.g., UML class diagrams, UML collaboration diagrams, etc.), the BPMN metamodel, the ARTS family of modeling languages (EPC, VAC, FAD, etc.), the entity-relationship (meta)model (ERM), the relational (meta)model, etc. A metamodel, being an abstract language, may be thought of as a collection of modeling elements that can be used or "instantiated" to describe the actual models. For instance, in a UML class diagram, modeling elements include classes, associations, properties, etc., whereas the model elements in the relational model include relations and their attributes. These modeling elements can be arranged in a variety of well-defined ways to build formal models representing potentially complex business and/or technical processing or other flows.

A metamodel is in principle independent of a concrete notation and therefore may be thought of as an "abstract language," as indicated above. For instance, a metamodel may define only the language concepts and the rules for their use to form a valid model for the metamodel itself. To do actual modeling with a metamodel, however, a concrete notation is required. Notations of metamodel elements include, for example, boxes with three "compartments" that represent UML classes, labeled rectangles and diamonds used to represent entities and relationships in the ERM, etc.

A common trait of many metamodels is that corresponding models can be represented as a graph including nodes and edges, which collectively can be referred to as the graph's "elements." Computer systems handling different "kinds" of models (e.g., so-called model management systems) often use some kind of graph model as internal representation for all kinds of models.

Model merging involves creating a single merged result model C, from two models A and B (where A, B, and C can be expressed in the same metamodel), that possibly describe the same or overlapping sets of application artifacts (e.g., the same software system, the same business process, etc.), but describe these artifacts differently. For example, A and B could be two versions of the same original model that were modified independently. As another example, A and B might describe different aspects of an application domain that share some overlap.

It would be desirable to run a merge function to deliver a merged model C that does not contain redundancies. That is, it would be desirable to help ensure that all model elements that appear in both A and B appear at most once in the merged model C. Depending on the exact purpose of C, it oftentimes is desirable to preserve all elements that are either in A or B. Doing so may help to reduce the likelihood of information being lost from the input models. However, this is not a general requirement for merging. It also would be desirable to have the merged model C be consistent and well formed, e.g., so that it meets the constraints of its respective metamodel.

With models being some kind of graphs, model merging is a different challenge than the more common (and usually line-wise) merging of text files as it is done, e.g., in version control systems. Text-based merging of models is theoretically possible if there is a textual (e.g., XML-based) notation for their respective metamodel. However, text-based merge tools are not natural tools for handling the merging of models. For example, most textual representations are ill-suited for direct use by humans and are only meant as storage formats or for model interchange. In particular, the structure of the (linear) textual representations usually differs considerably from the non-linear, graph-like structure of the model itself, making it difficult and cumbersome to work directly with these representations. Second, even small changes of a model can lead to significant changes of its textual representation, making it hard to differentiate between the actual changes on the model level and purely "syntactical" changes implicated by the textual representation. Text-based tools therefore are not really appropriate for model merging.

When designing a merge system for merging two models A and B, a function may be provided for identifying pairs of elements $a_i$ and $b_j$ from A and B, respectively, that are considered identical (or at least elements that after a successful merge operation should appear only once in the resulting merged model C). "Identical" element pairs are discussed herein as a mapping relation $map_{AB}: A \times B$.

It will be appreciated that $map_{AB}$, being a relation, need neither be injective nor surjective nor a function. In general, model elements from A need not have counterparts in B, and vice versa, and an element $a_i$ from A could possibly have several "identical" elements $b_{i1}, \ldots, B_{in}$ in B and vice versa. In literature, techniques for producing such a $map_{AB}$ from two models A and B are called schema or model matching techniques. In other scenarios, such a $map_{AB}$ can also result from the process that created models A and B.

Based on the content of $map_{AB}$, it is possible to distinguish different categories of (pairs of, groups of, individual, etc.) objects from A and B:

If two objects $a_i \in A$ and $b_j \in B$ are identified as identical by $map_{AB}$ (e.g., $(a_i, b_j) \in map_{AB}$), and if no other entries involving $a_i$ or $b_j$ exist in $map_{AB}$ a ($\exists a_x$ s.t. $(a_x, b_j) \in map_{AB} \wedge \exists b_y$ s.t. $(a_i, b_y) \in map_{AB}$) and if $a_i$ and $b_j$ agree on all properties that are relevant for the merge method (e.g., certain attributes, etc.), then $a_i$ and $b_j$ can be called equal. If $a_i$ and $b_j$ differ in some of their merge-relevant properties, these objects can be referred to as having been changed.

Objects $a_i \in A$ ($b_j \in B$, respectively) for which there exists no object $b_j \in B$ ($a_i \in A$, respectively) such that $(a_i, b_j) \in map_{AB}$ ($\exists b_j \in B$ s.t. $(a_i, b_j) \in map_{AB}$) ($\exists a_i$ s.t. $(a_i, b_j) \in map_{AB}$, resp.) may be called added in A (added in B, respectively).

If two objects $a_i \in A$ and $b_j \in B$ are identified as identical by $map_{AB}$ (e.g., $(a_i, b_j) \in map_{AB}$), and if other entries involving $a_i$ or $b_j$ exist in $map_{AB}$ (($a_x$ s.t. $(a_x, b_j) \in map_{AB}$) $\vee$ ($b_y$ s.t. $(a_i, b_y) \in map_{AB}$)), these objects may be referred to as being conflicting.

With this information, a merge method may create a consistent result model C. While the handling of objects that are equal is seemingly straightforward, it may be the case that decisions have to be made for all other kinds of objects if and how to accept them into the result model C. These decisions may depend on, for example, the intended purpose of C, the details of the conflicts, the context in which A and B where created, etc. These difficulties demonstrate that model merging currently is inevitably a manual task of which only certain trivial tasks can be safely automated. This also implies that, in general, a human has to decide which elements and which properties to take from A and which from B, for inclusion into the result C.

The ARIS model transformation component, provided by the assignee of the instant invention, allows users to declaratively describe how models of one type can be transformed into a semantically related model of a different (or sometimes also the same) model type. An example for such a transformation is shown in FIG. 1. In FIG. 1, a business process modeled using the event-process chain (EPC) metamodel is transformed into an equivalent process in the "business process model and notation" (BPMN) metamodel. This transformation can be referred to as an EPC-2-BPMN transformation. Although the EPC metamodel may be meant to be used by business-oriented users to capture business processes as they are (or should be) handled in an organization, BPMN is a metamodel and notation that also covers more technical aspects. Using the EPC-2-BPMN transformation, a BPMN can be created from an EPC to be used as starting point for enriching the business view of a process with technical details to ultimately make the process executable by a suitable runtime environment like a workflow management system (WfMS). However, the present invention is not limited to the modeling of business processes, but may well be used in other scenarios such as, for example, the systems engineering of complex technical products. For example, the development process of a vehicle is nowadays largely model based. In this scenario, the various vehicle components are typically modeled on a system-wide level defining the main mechanical components such as the chassis, engine and power train, as well as electric/electronic components such as rain sensors, speed-limiters, embedded processors and the related software. Further, the individual vehicle components are themselves defined by more and more concrete technical model as the development process continues, ultimately leading to a variety of technical component models on different levels of abstraction, but yet strongly interrelated.

The description of the transformation is given by so-called transformation patterns or rules, which specify how individual or groups of elements of the source model type are translated into corresponding elements of the target model type. The ARIS model transformation, in particular the graphical way to describe transformation patterns, is discussed in detail in U.S. Publication No. 2009/0265684, the entire contents of which are hereby incorporated herein by reference. A transformation pattern includes a source pattern, a target pattern, and a mapping. The source pattern can be understood as a graphical query over the input model(s) that describes the structures of the source model to be found and transformed. Each region of the input model that conforms to the structure described by a source pattern can be considered a match for this rule. A transformation pattern's target pattern describes what elements and structures of the target model type are to be created for each match. The structure that is created in the result model for each match can be called a fragment. Of course, transformation patterns or rules may be defined in other ways such as, for example, by hard-coding specific functionality.

Using the mapping part of a rule, the developer can graphically define how attributes and properties of the source model elements matching the source pattern are to be transferred into the attributes and properties of the target model elements. By placing additional operators in the mapping and connecting them accordingly, the creation of complex mappings can be done graphically, e.g., without the hurdle of handling a complex expression syntax, as it is found in other model transformation languages.

Several simplified examples for transformation rules are set forth below. FIG. 2 is an example pattern for transforming a function to an abstract task. The source pattern of the rule "Function to abstract task" in the upper-left of FIG. 2 includes only an EPC function. The target pattern shown to the right declares that such a structure is to be translated into a BPMN abstract task object, which is to be placed into a lane, with the lane being placed into a pool object. The mapping shown in the lower part of the drawing indicates that the abstract task object is to carry the same name as the matched source function, and that the lane into which the manual task is to be placed is to be named "default lane."

FIG. 3 is an example pattern for transforming a function with an organizational unit to a manual task. The rule "Function with organizational unit to manual task" shown in FIG. 3 can be considered a special case of the rule "Function to abstract task" from FIG. 2. As above, the source pattern includes an EPC function, but the function in this example is connected with an organizational unit. It is noted that objects that do not directly describe the main process flow but which instead are placed adjacent to an element of the main process flow (such as the organizational unit element in this example) may be referred to informally as satellite objects. The target pattern in FIG. 2 seems to be very similar to the one from the FIG. 2 example rule. However, instead of creating an abstract task, a manual task object is being created. Further, instead of placing the task into a "default lane," the lane is now named based on the source organizational unit element.

The degree of complexity transformation rules can have can be quite large. For instance, FIG. 4 is another example rule that creates a special kind of task based on a specific constellation of EPC elements. In FIG. 4, an EPC function connected with a business service is translated to a BPMN service task. As can be seen from FIG. 4, the source and target patterns of this rule include assigned models. For the source pattern to match in this example, an assigned model must exist at the business service. In this model, an additional software service type object that describes the business service in more detail has to exist. This object itself in this example must again be detailed by second source side assignment, as shown in the lower-left corner of FIG. 4. The rule will match and create a corresponding Service Task only if this exact structure is found, and an assigned model will be placed at this service task that holds additional information about the service task based on the assignments matched by the source pattern.

Similar specializations may exist for different constellations of EPC functions and satellite objects that create different types of tasks. With additional rules that specify how to transform other elements of an EPC model, like events and rules into corresponding elements in BPMN, the EPC-2-BPMN transformation can translate all elements of an EPC model that are also relevant on the technical level into a semantically equivalent BPMN model.

One challenge in the design of the EPC-2-BPMN transformation involved the handling of ambiguities. Consider, for example, a function that is connected to both a business service and an organizational unit. In this situation, both the "Function with organizational unit to manual task" and the "Function with business service to service task" patterns would match, but would disagree in their result (e.g., symbol type, placement into a lane etc.). One possibility for addressing this issue involves prioritizing the patterns in a transformation (e.g., preferring the creation of a service task in this situation). Another option involves designing patterns that could "compete" about the same source model elements in such a way that they are only applicable if exactly one of them matches unambiguously for a given function. Following the former approach, the ambiguous example function would be transformed to a manual task, as the manual task pattern has a higher priority.

Business process management (BPM) aims to capture, analyze, and optimize or improve how companies perform their processes, and attempts to provide IT support for conducting the processes more efficiently in everyday business. One aspect of BPM involves introducing workflow management systems (WfMS) that control the execution of processes, both regarding activities performed by humans (e.g., with varying degrees of IT support) and activities performed in completely automated manners and possibly with the help of software and/or other technical systems. In the conventional, manual approach, BPM starts with human experts analyzing how an organization is currently conducting its business processes. The results of this analysis are captured in various ways, either informally as requirement documents, or in a semi-formal notation like the aforementioned EPCs. After an optional optimization step, these business-centric process descriptions are cast into a technical process description that can ultimately be executed by the WfMS. As part of this implementation step, aspects that are not captured by the business process descriptions may be filled in, e.g., by identifying and connecting information systems that are needed for a process, etc. Being a fully manual development task, this approach is both slow and costly.

Model-2-execution (M2E), however, aims to reduce the enormous manual development effort of BPMN by automating parts of the translation of the business-centric process descriptions into executable, technical specifications. An aspect of M2E thus involves adapting the concepts of model-driven development (MDD) to the BPM world, e.g., by replacing a large part of the manual work with model-2-model transformations. The EPC-2-BPMN transformation introduced above may be used as a transformation in model-2-execution approaches. In MDD terminology, the EPC-2-BPMN transformation can be understood as a transformation from the computational-independent model (CIM) that does not capture aspects related to the implementation with an IT system, to the platform-independent model (PIM). A PIM may cover aspects relevant for the implementation, but may nonetheless still be independent of a concrete implementation technology used (e.g., in the case of BPM, the concrete workflow management system that is used, or how the WfMS communicates with other required IT systems, etc.).

In the context of the model transformation in model-driven development in general, and specifically also in MDD for BPM as it is pursued by the M2E approaches, the situation often arises that after a creation of the initial transformed model T via a transformation run, the source model S is changed by a business user, yielding a modified source model S', as illustrated in FIG. 5. To propagate these changes to the technical BPMN layer, it may be possible to transform S' again, yielding a new transformed model T'. However, in the meantime, a process engineer might have modified the original BPMN model T and augmented it with technical information, that way yielding a modified BPMN model T''. In this case, it is not desirable to simply replace T'' with T' to get the business-level changes to the technical level, as this would lose all changes by the technical user that yielded T''. Unless either T' or T'' can be discarded as a whole and the changes from only T'' or T' can be taken into the result, the independent changes in T' and T'' may need to be combined into a single, consistent merged model $T_M$ by merging these two models T' and T''. In this merge process, T' (e.g., the model resulting from transforming the modified source model S') may be referred to as the new transformed model, and T'' may be referred to as the merge target model.

In the FIG. 5 example, the business user adds a function F3 to the process as an (exclusive) alternative to F2 to create S'. In the original transformed model T, the process engineer adds an additional task F2b to create T''. F2b could represent a task that is necessary from a technical standpoint, but need not be reflected on the business level. When S' is now transformed to obtain T', it can be seen that T' and T'' differ and that a merge may need to be performed to obtain a result that reflects the changes in both models as good as possible.

As discussed above (e.g., in connection with the general model merge problem) to be able to successfully merge the two models T' and T'', it would be desirable to provide a way to identify elements that are to be considered "identical" for the purpose of merging, e.g., a way to obtain a $map_{T'T''}$. Instead of using inherently fuzzy methods such as, for example, guessing pairs of identical (e.g., mergeable) objects based on their properties (e.g., name, type, etc.), or even leaving the identification of pairs of identical objects completely to the user, the transformation itself my place "trace" information on all elements that it creates. This trace information may include for each element $t_i$ in the transformed model, among other things, information about which transformation rules were involved in the creation of $t_i$, the identities of the source element(s) in model S that were "responsible" for the creation of $t_i$ (e.g., those source model elements that were matched by the source patterns of the different transformation rules that helped to create $t_i$), etc. Two objects t'∈T', t''∈T'' may be considered identical (e.g., will be found in a tuple of $map_{T'T''}$) if they agree to a sufficient degree in their trace information and some additional properties. While this may sound counterintuitive at first, this merge semantics may be valuable because, in practice, models tend to have many objects whose properties (e.g., type, symbol, attributes such as name, etc.) are equal, and that are consequently transformed to result model objects that are also equal. Thus, if the identity of their source model elements were not used as a distinguishing criterion, it might not be possible to disambiguate these equal (but not identical) result model elements and thus it might not be possible to perform proper non-ambiguous merging. Further, by merging via source object identity, it also may be possible to transfer changes of properties (e.g., a renaming of an EPC object) during the merge. If the merge decision were based on properties and if these properties were modified on either source or target model, the objects could not be merged.

In the existing implementation of the model merge in the scope of the ARIS model transformation, the transforming of S' into T' and merging T' with the merge target model T'' with T' is an integral process. The user may pick the source model, the merge target model, and may be presented with a single model that illustrates the conflicts between T' and T", as shown below in FIG. 6. This model may be referred to as the conflict model $T_C$. In the conflict model, the user may resolve the remaining conflicts to create the final merge model $T_M$. Conflicts may be indicated, for example, with graphical icons next to the conflicting elements. These icons may also be referred to as the corresponding element's "merge state."

With the $map_{T'T''}$ obtained via the transformation's trace information as discussed above, the conflict model may be created as follows:

Pairs of elements $a \in T'$ and $b \in T''$ that are identical or changed are shown only once in the result, like the functions F1 and F2, the start and end events, the lanes, and the pool in this example. These elements have no conflicts or "merge state" associated with them. It is noted that that attribute changes that occur in S' may be written into the existing objects, e.g., the source model silently overwrites any attribute changes in the target. Thus, for the purpose of the merge in the ARIS model transformation, equal and changed objects may be handled identically.

Elements that are found in T' but have no counterpart in T" (according to $map_{T'T''}$) are added to the conflict model and flagged with the merge state "added by transformation" (or "added in source"), indicated by a green plus icon next to these elements. In the example, it can be seen that the BPMN gateway created from the new XOR rule, the task F3 created from the new function F3, and the new "End 2" end event are marked as such, as are all connections between them. Further, the connection between task F2 and the end event "End" is marked with "added by transformation." This might seem non-intuitive, as the corresponding connection has not been changed from S to S'. However, the corresponding connection in T" had been deleted when F2b was inserted by the process engineer. In an ideal scenario, the actual merge state of this connection might have to be "deleted in target." The merge, however, may not be able to distinguish between these two situations. To be able to correctly flag this connection as "deleted in target," it may be necessary to maintain the complete change history of T', which could be difficult or impossible or simply not worth the tradeoffs between size, space, complexity, possible processing gains, etc.

For elements that are found in T" and have no counterpart in T', two situations can be differentiated. If such an element t was created by the (original) transformation (that can be determined based on the presence of trace information on t), this may indicates that the source model S' has changed in a way such that an object corresponding to t is no longer created by the current transformation. Consequently, it may be added to the conflict model and flagged with the merge state "deleted by transformation," e.g., as indicated by a red minus icon. In this example, the connection between F1 and F2 that was in the original T and was preserved by the process engineer when creating T" is marked as such, because the connection no longer exists in T', since the corresponding connection in the EPC has been deleted by the business user when going from S to S'.

If an element t was manually added to T", which can be recognized by the absence of trace information, it also may be added to the conflict model and flagged with the merge state "added in target," indicated by a blue plus icon. In this example, the function F2b and incident connections are marked as such.

Together, each object that has one of the three merge states can be referred to as an atomic conflict.

Via the user interface, the user can individually accept or reject the individual atomic conflicts. When accepting an "added by transformation" or "added in target model" conflict, the corresponding model element is retained and the merge state is removed, to indicate that the conflict has been resolved. When rejecting such a conflict, the model element is deleted. When accepting a "deleted by transformation" conflict, the element is deleted. When rejecting it, the element is retained and the merge state is removed.

While it is possible to handle the resolution of merge conflicts by individually accepting or rejecting atomic conflicts, this approach is not very convenient and can sometimes confront the user with internal details of the model representation in ARTS. Business users may be presented with potentially complicated technical details, technical people may be presented with business aspects that they do not necessarily understand, etc. To make the resolution of merge conflicts easier, the concept of high-level conflicts has been introduced by the assignee of the instant invention. In this regard, it is possible to use the basic information obtained during merging as described above including, for example, the different merge states of objects (equal, changed, added in A/B, conflicting, etc.) and their constellations in the models being merged, to recognize high-level merge conflicts. Instead of leaving the user to resolve the merge conflicts on the level of the atomic elements (e.g., objects and connections with a non-empty merge state), high-level merge conflicts may capture the semantics of the differences between the models being merged on a larger scale (e.g., possibly covering a very large number of model elements in one conflict) and—most of the time—allow the user to resolve them easily and quickly within a single operation. This approach to making conflict resolution both easier and more convenient is described in detail in U.S. application Ser. No. 13/024,646, filed on Feb. 10, 2011, the entire contents of which are hereby incorporated herein by reference.

The merge view is a tool that helps make the task of interactive merging easier for the user, especially for larger models. It displays the source model and the conflict model side-by-side, as illustrated below in FIG. 7. It then allows the user to find out how each element in the target model, shown to the right, corresponds to element(s) in the source model, shown to the left (or vice versa), simply by selecting the element the user is interested in. If an element in the source model is selected, the corresponding elements in the target model are selected, and vice versa, as shown in FIG. 7 for EPC Function F1 and its corresponding BPMN task. In addition to selecting the corresponding elements, the respective other view's viewport is automatically scrolled to the selected elements, a feature that can be beneficial when working with models that are too large to fit on one screen. The correspondence information displayed by the merge view is derived from the transformation trace information discussed above.

In general, the relationship between source and target model elements can be of any cardinality up to many-to-many, e.g., such that each source (target) element can have zero, one, or many corresponding elements on target (source) side.

As indicated above, the assignee has provided merge functionality (including the complex conflict detection covered by U.S. application Ser. No. 13/024,646) in the ARIS model transformation component. In addition, the ARIS model merge component, provided by the assignee of the instant invention, works with ARIS, which offers XML-based import and export modules for transferring ARIS models between different ARIS databases. For example, a model M may be created in DB X, exported to a file, and imported into DB Y. Assume that model M is now changed in X, yielding a modified model M', and at the same time, the originally imported model M is also changed independently in DB Y, yielding model M". M' is now exported again into an XML file, and imported into DB Y. Because M' and M" are different versions of the same model (a fact that can be recognized via unique identifiers on the model and its model elements), a model merge may need to be performed. When importing M', the user can select whether or not model M' (setting "source overwrites target") or model M" (setting "target preserved") will prevail in case of conflicts. These settings can be set differently for objects, connections, models, etc. However, this merge technique does not offer selective control over how individual conflicts are resolved. In this sense, it is not interactive. It further does not allow users to bring a selection of changes from model M' back to M".

A large number of computer-aided software engineering (CASE) tools claim variable degrees of MDD support. However, aside from some "convenience" features, the actual application behavior typically has to be implemented by hand, e.g., by "filling out" empty method bodies or adding and detailing aspects that were not fleshed out in full detail in the models. Other manual work includes the customization of the aforementioned out-of-the-box features (like customizing the default object serialization so that it conforms to existing storage formats or database schemas).

In roundtrip engineering for software engineering, the artifacts generated from the model are in general not other models, but rather program code (e.g., structured text). Further, a general common assumption of roundtrip engineering approach in the software engineering domain is that in general, all changes performed on the PSM level that could be represented with the modeling language used for the PIM should be propagated. In contrast, in the scope of the M2E roundtrip, only selected aspects that have been added to or changed in the BPMN model should actually be propagated. Consequently, in M2E, the decision to propagate a change is a conscious choice by a user on a case-by-case base, guided by the semantics of the artifacts involved.

Another issue that arises with roundtrip engineering in software engineering contexts is that many aspects that can be represented explicitly with dedicated model elements (e.g., containment or aggregation associations) are mapped to the same basic elements of the target programming language (e.g., object references). Therefore, it is often difficult to recognize such aspects of modeling based on the code and properly propagate them back to the model level.

The functionality of the ARIS model transformation and the interactive merge as discussed allows merge conflicts to be resolved by accepting or rejecting changes in the BPMN model, whether they result from changes in the EPC or from direct changes in the BPMN model itself. As an example, consider FIG. 8, which shows a very simple merge scenario. EPC S is first transformed to a corresponding BPMN model T. Here, the process engineer makes a technical change by deleting the connection from task F1 to the end event, adding a new task "F2 added in BPMN," and connecting it with F1 and the End event, thereby creating the modified transformed BPMN model T"'.

In parallel, a business user makes a business change to the EPC by inserting another function F0 between the start event and the function F1, yielding the modified source model S'. If S' were to be transformed without a merge, the new transformed model T' would be obtained. If either T' or T"' were taken as the new BPMN model, the changes of either the process engineer or the business user, respectively, would be lost. To avoid such scenarios, interactive merge techniques can be used to reconcile the parallel changes. By merging T' with T"', a conflict model $T_C$ is produced. In this model, the high-level merge conflict detection discussed above identifies two high-level conflicts, namely, the addition of F0, and the deletion of the direct connection between the start event and F1 is recognized as a "replacement in source" conflict. This conflict can either be accepted (leading to the removal of the direct connection marked with the red minus sign in the conflict model and keeping F0 and its incident connections and removing their green plus sign merge state), or rejected (which causes the deletion of F0 and its connections, and removes the red minus sign merge marker from the connection between the Start event and F1).

The second high-level "replacement in target" conflict shown in detail to the left of FIG. 9, which demonstrates the options for resolving the "replacement in target" high-level conflict, is caused by the addition of the new Task "F2 added in BPMN" to the BPMN model by the process engineer. If this high-level conflict is accepted, the newly added task and its incident connections are kept in the result, their blue plus sign merge state is removed, and the green plus sign connection from F1 to the end event is removed, as shown on the upper-right of FIG. 9. If the high-level conflict is rejected, the connection from F1 to the end event is kept, its green plus sign merge state is removed, and the new task "F2 added in BPMN" and its incident connections are removed, as illustrated on the lower right of FIG. 9.

Although the concept of high-level conflicts makes it easier for the user to resolve the merge conflict caused by the addition of an element in the BPMN model, this conflict resolution only affects the BPMN model. The EPC is left unchanged. While this is a desired result in those cases where the additions and changes in the BPMN model only represent a technical detail that has no implications for the business view of our process (e.g., do not require changes of the EPC source model), there are many situations where it would in fact be desirable to have individual (but not necessarily all) changes made in the BPMN model to be reflected on the EPC, because they are in fact relevant for the business user. Thus, this current approach does not support the person performing the interactive merge in propagating such changes from the technical BPMN level to the EPC level. As explained below, however, there are a number of drawbacks to manually solving these issues.

With a manual propagation, the user has to change the EPC in a way such that the new transformation result after the change gives the same result as currently provided in the BPMN, or make the changes made in the BPMN that had been propagated to the EPC appear as if they had "always been modeled like that" in the source EPC model.

FIG. 10 illustrates how a user performing an interactive merge can manually perform a propagation of the BPMN-side addition of the abstract task "F2 added in BPMN" (referred to below as $F2_{BPMN}$) as in the FIG. 8 example. Here, the user manually creates a like-named function in the EPC $F2_{EPC}$ and connects it analogously to how $F2_{BPMN}$ is connected with its surroundings in the BPMN model T"'. The result of this manual propagation is shown on the upper-left of FIG. 10 as EPC S"'. The user basically creates a situation so that the corresponding transformation pattern(s) (which here would be the "Function to Abstract task" pattern we introduced above in FIG. 2) match and in the next transformation run would create the same situation that exists in the BPMN model because of the manual changes that were made there.

One disadvantage of such a manual approach relates to the effort involved for the user. While it may seem straightforward in this simple example, once more than a few changes have to be propagated to the EPC, this approach can quickly become a repetitive, time consuming, and error-prone task.

In addition, a correct propagation is not always as simple and obvious as in this example where the creation and connection of only a single object in the EPC was involved. Consider, for example, the "Function with business service to service task" transformation rule discussed in connection with FIG. 4. If there were a desire to propagate a service task that was added to the BPMN model so that this rule now matches, a quite complex object structure, including several assigned models, would have to be created correctly. To be done correctly, it may be necessary to have a very detailed understanding of the semantics of our EPC-2-BPMN transformation, which cannot always be reasonably expected from the users performing an interactive merge. The problem of correct and consistent model propagation is similarly severe in the above-mentioned systems engineering context. For example, strong interrelations exist between the different technical models of the vehicle components of an automobile, since the vehicle components typically have multiple interaction points (consider, for instance, an optical or radar-based distance sensor component that is shared by both a software-based speed-limiter and an emergency breaking component). Such strong interrelations as well as other feature interactions can make the correct and consistent propagation of model elements between different model levels quite difficult.

Even if the manual effort and the required internal knowledge about the transformation were considered acceptable, such manual change propagation may also have technical restrictions. Referring still to the example manual propagation from FIG. 10, if S" were transformed again, a new result model T'" including a task "F2 added in BPMN" ($F2_{EPC}'$) created by the transformation of $F2_{EPC}$ would be created. At first glance, this model appears identical to the modified transformed BPMN model T" where the user manually added the new business-relevant task $F2_{BPMN}$. Consequently, one might be tempted to expect that if these two models were to be merged that no conflict would be shown involving the Task "F2 added in BPMN," and that the manual change propagation was successful. However, as we discussed above, the transformation's built-in merge functionality does not rely on the properties like object type, symbol, or name of a pair of objects to determine whether or not they are mergeable, but instead uses the transformation's internal trace information. As explained above, this trace information includes for each result object of a transformation both the set of source model objects that contributed to the creation of a transformation result and the transformation patterns that were involved in its creation. Consequently, if a user were to perform a transformation plus merge of S" into T", the Abstract Task $F2_{BPMN}'$ created by the transformation from the manually added EPC function $F2_{EPC}$ could not be merged with the Abstract Task $F2_{BPMN}$ that was added directly to the BPMN, since they disagree in their trace information, inasmuch as $F2_{BPMN}'$ indicates that it originates from $F2_{EPC}$, while $F2_{BPMN}$ does not indicate any source object because it was never created by a transformation in the first place. The conflict model $T_C$ as shown on the bottom of FIG. 10, which contains both Abstract Tasks $F2_{BPMN}$ and $F2_{BPMN}'$, therefore would be produced.

The high-level "replacement in target" conflict could be resolved, and either the task $F2_{BPMN}'$ coming from the EPC via the transformation (marked as "added in source" with the green plus sign) or the task $F2_{BPMN}$ from the BPMN (marked as "added in target" with the blue plus sign), could be kept. Doing so, however, would still not provide the desired result. If $F2_{BPMN}'$ were kept by rejecting the "replacement in target" conflict, a proper correspondence between the objects in the EPC and the BPMN model would be produced, but any additional technical details the process engineer might have put into the discarded $F2_{BPMN}$ (e.g., setting technical attributes or adding assignments with information about the invoked service etc.) would be lost. On the other hand, if $F2_{BPMN}$ were kept instead, this technical information would be preserved, but no proper correspondence would exist between $F2_{BPMN}$ and $F2_{EPC}$. Not only would these two objects not be shown as corresponding in the merge view, but changes to $F2_{EPC}$ (e.g., a renaming) would not be propagated to $F2_{BPMN}$ in future merge operations.

The example discussed immediately above dealt with the propagation of model elements that were new to the target model. Another common type of propagation oftentimes needed in MDD scenarios involves not only additions of new elements, but also augmentations, refinements, or other changes to existing target model elements that were created by the transformation from elements in the source model that are to be reflected by corresponding changes in the source model. In the example shown in FIG. 11, the Abstract Task F1 created by the transformation out of a simple EPC function without any "satellite" objects is refined by the process engineer into a service task. The service invoked by the task is specified in an additional model assigned to the service task.

If transform and merge operations were now performed, a merge conflict would be produced not because the trace information differs, but because the objects deviate in symbol type (abstract task vs. service task) and the number and type of assignments (no assignments vs. a function allocation diagram), as shown on the bottom of FIG. 11. Again, it is possible to resolve the conflict if it is found that the BPMN-side change is not relevant for the business user. As before, this would come at the cost that any renaming, etc., of F1 in the EPC would not be propagated. However, if it is thought or needed that the EPC should reflect the change, a manual propagation of the BPMN-side change as shown below in FIG. 12 can be performed. To make the EPC function F1 be translated to a service task that looks just like the one the process engineer created in the BPMN model, the set of assigned models and associated objects shown at the upper-right of FIG. 12 can be added, that way helping to ensure that F1 is now successfully matched by the source pattern of the transformation rule "Function with business service to service task" from FIG. 4. This example helps illustrate that once one tries to propagate a change involving a more complex pattern, the effort involved and the knowledge needed to "get it right" quickly becomes prohibitive in practice. If the manually modified EPC were again transformed and merged with the BPMN model, a similar situation as before would arise. That is, although the two would look identical, the two service tasks F1 from T'" and T" could not be merged successfully, with all the negative consequences that this has for the correct functioning of the merge view and the future automated propagatation of changes to $F1_{EPC}$ to $F1_{BPMN}$, discussed in the previous example from above.

Thus far, problems of manually propagating additions or changes in the (BPMN) target model to the (EPC) source model have been discussed. As shown above, there oftentimes will be a manual effort involved in such a task for anything but the most trivial cases, and limitations of this manual approach that are related to the way the model merge decides whether two objects are mergeable have been described. Aside from additions and changes, a third kind of modification operation that can be performed on the target model relates to deletions.

FIG. 13 illustrates an example for a deletion on BPMN side: The process engineer removes the manual task object "F2" and "bridges" the gap that is created in the process flow by adding a direct connection between F2's former predecessor manual task "F1" and its former successor end event "End". If transform and merge operations were now performed again, a "replacement in target" high-level conflict would be generated in the resulting conflict model $T_C$, as shown near the bottom of the drawing. Accepting this conflict (accepting the replacement of F2 and its two incident edges with a single edge) would lead to the result shown to the lower left, whereas rejecting it would retain the original transformation result as shown to the lower right of the drawing.

If the change on the technical BPMN level is now considered relevant for the business level, the deletion could again be propagated manually, as shown in FIG. 14. Here, the EPC is changed in accordance to the change on BPMN level, such that the function "F2" and its neighboring occurrence of the "Otto" Organizational Unit object are removed. If the modified source model were now transformed, the result would be structurally identical to the original BPMN model modified on source side. If transform and merge operations again were performed, the result (whether there are conflicts in the merge) would depend on the details of the merge method (or the way the mapping relation $map_{AB}$ is obtained) used. If the merge method considers two connections mergeable if their start and end objects are mergeable, no merge conflict will arise, as shown to the left on the bottom of FIG. 14.

If, however, the merge method uses the identity-based mergeability decision discussed above not only for deciding the mergeability of objects, but also for connections, a conflict like the one shown in the lower right of FIG. 16 could arise. In these situations, as with the addition and modification operations discussed before, a manual propagation of the changes on the technical level to the business level would not be possible, as the user would need to manipulate the internal trace information, etc.

Thus, it will be appreciated that there is a need in the art for techniques that help support users manage model transformations and/or merges, and/or approaches that help overcome the above-described and/or other complications that arise when attempting to transform and/or merge models. Those skilled in the art of model-based systems engineering will appreciate that these problems are equally relevant in all of the above-described use cases, including the manufacturing of complex technical products, the model-based controlling of manufacturing machinery as well as the modeling of business processes.

One aspect of certain example embodiments relates to an automated approach for propagating (or pulling up) business relevant changes made in a technical model (e.g., BPMN model) to the business-oriented model (e.g., EPC model). Doing so may reduce and sometimes eliminate the need for manual change propagations. According to certain example embodiments relates to avoiding conflicts, e.g., by making certain changed objects appear as if they were created by the "pulled-up" EPC object by changing its internal attributes needed for the merge. Optionally, the BPMN model may be "corrected" so that the merge is possible without conflicts.

Another aspect of certain example embodiments relates to a selective, partial inversion of a transformation from the technical model to the business-oriented model, or vice versa.

Another aspect of certain example embodiments relates to a pull-up operation that includes enablement checking (e.g., determining whether the pull-up can be applied to a selected object) and pull-up execution.

According to certain example embodiments, enablement checking may be separated into multiple phases. In a first example phase, a coarse check may be performed to determine whether the pull-up operation makes sense, possibly returning a Boolean true/false value. In a second example phase, a more detailed check may be performed to determine whether the pull-up really can be executed, possibly returning a list of reasons informing the user why the pull-up cannot be applied.

According to certain example embodiments, the pull-up execution may include, for instance, creating the object(s) in the business-oriented (e.g., EPC) model; updating relevant internal attributes of the technical (e.g., BPMN) objects that allow for the successful merge; optionally correcting user-introduced errors in the technical (e.g., BPMN) model; and properly connecting the pulled-up objects with their surroundings.

Another aspect of certain example embodiments relates to connecting pulled-up objects with their surroundings so that, after the propagation, the objects appear as if the current business-oriented (e.g., EPC) model was used for the merge. According to certain example embodiments, the connecting may be deterministic, e.g., such that the result will be the same regardless of order or sequence in which the propagations are made.

According to certain example embodiments, the connecting algorithm includes finding the target-side successor and predecessor elements (together referred to as border elements) of the target model object that is being propagated; using trace information to find the source-side elements corresponding to the target model predecessors and successors; optionally deleting border-spanning connections (e.g., if a change propagation action is performed during conflict resolution); and creating connections to and from the propagated object.

Still another aspect of certain example embodiments relates to propagating changes notwithstanding internal inconsistencies in a model.

In certain example embodiments, a method of propagating changes made in a first computer-represented model to a second first computer-represented model is provided. Input corresponding to at least one change to the first model is received, with the at least one change indicating that at least one object in the first model has been added, modified, and/or deleted. An instruction to propagate the at least one change made to the first model to the second model is received. At least one corresponding change propagation action (CPA) is executed, via at least one processor, to cause the at least one change made to the first model to be propagated to the second model in whole or in part as appropriate in achieving consistency between the first and second models following said executing. The at least one CPA including instructions that, when executed, comprise: determining whether the at least one change propagation action can be applied for the at least one change, and when it is determined that the at least one change propagation action can be applied for the change, linking the at least one object to at least one other object in the second model. Each said CPA corresponds to one or more corresponding transformation patterns or rules and includes program logic executable by the at least one processor to carry out the respective transformation pattern(s) or rule(s) in inverse direction(s). The first model is a technical-oriented model and the second model is a corresponding business-oriented model, or vice versa.

In certain example embodiments, a modeling system is configured to enable a user to propagate changes made in a first computer-represented model to a second computer-represented model. The system comprises processing resources that include at least one processor and a memory. The processing resources being programmed to: accept input corresponding to at least one user-specified change to the first model, with the at least one change indicating that at least one object in the first model has been added, modified, and/or deleted; receive an instruction to propagate the at least one change made to the first model to the second model; and execute at least one program logic bundle, selected from a group of executable program logic bundles, in order to selectively cause some or all alterations associated with the at least one change made to the first model to be propagated to the second model so that the first and second models become consistent with one another at least in one or more area(s) affected by the propagation. The at least one program logic bundle being programmed to: determine whether the at least one program logic bundle can be applied for the at least one change, and when it is determined that the at least one program logic bundle can be applied for the change, link the at least one object to at least one other object in the second model. Each program logic bundle corresponds to at least one respective transformation pattern or rule to be selectively applied in inverse direction(s) upon execution. The first model is a target of a transformation and a source of a propagation, and the second model is a source of the transformation and a target of the propagation.

According to certain example embodiments, the linking may includes, for an object added in the first model: (a) creating one or more corresponding elements in the second model; (b) searching for border objects adjacent to the object added in the first model that do not have a merge state conflict; (c) for each border object in the first model, identifying a corresponding border object in the second model; and (d) for each path from the object added in the first model to a border object in the first model: when there are one or more objects along the path, adding a direct connection from the object added in the first model to the respective border object, setting a merge state of the direct connection to indicate that it was added in the first model, and creating one or more corresponding connections in the second model; and otherwise: removing an added in target merge state from the existing single connection and adding one or more corresponding connections in the second model.

In certain example embodiments, there is provided a method for selectively propagating changes made in a first computer-represented model to a second computer-represented model across a modeling system comprising processing resources including at least one processor. An instruction to propagate at least one change made to the first model to the second model is received, with the change corresponding to an object being added in the first model. At least one corresponding change propagation action (CPA) is executed, via at least one processor, to cause the at least one change made to the first model to be propagated to the second model. The at least on corresponding CPA is practiced by: performing an enablement check to determine whether the at least one CPA can be applied for the at least one change, and when the enablement check indicates that the at least one CPA can be applied for the change, connecting the at least one object to at least one other object in the second model. The connecting is practiced, in connection with the processing resources, by at least:

(a) finding first model side border elements of the first model object that is being propagated $o^{1st}$ including:
  (i) storing all outbound directed paths that start at $o^{1st}$ and follow added-in-first-model connections to a list of outbound paths, $path^{out}=\{path_1^{out}, \ldots, path_n^{out}\}$,
  (ii) defining a multiset of end objects for the outbound paths $succ^{1st}=\{s_1^{1st}, \ldots, s_n^{1st}\}$, this multiset being first model successors to $o^{1st}$,
  (iii) storing all inbound directed paths that start at $o^{1st}$ and follow added-in-first-model connections (in an inverse direction) to a list of inbound paths, $path^{in}=\{path_1^{in}, \ldots, path_m^{in}\}$,
  (iv) defining a multiset of start objects for the inbound paths $pred^{1st}=\{p_1^{1st}, \ldots, p_n^{1st}\}$, this multiset being first model predecessors to $o^{1st}$, and
  (v) defining the union of the first model predecessors and successors $succ^{1st} \cup pred^{1st}=border^{1st}$, this union being the set of first model border objects;

(b) using trace information to find elements in the second model corresponding to the first model predecessors $pred^{2nd}=\{p_1^{2nd}, \ldots, p_n^{2nd}\}$ andsuccessors $suce^{2nd}=\{s_1^{2nd}, \ldots, s_n^{2nd}\}$, and (c) for each $p_i^{2nd} \epsilon pred^{2nd}$ (or each $s_k^{2nd} \epsilon succ^{2nd}$):
  (i) creating a connection from $p_i^{2nd}$ to $o^{2nd}$ (or from $o^{2nd}$ to $s_k^{2nd}$) in the second model, wherein $o^{2nd}$ is the second model counterpart to $o^{1st}$.

According to certain example embodiments, (c) may further include:
  (ii) if a length of the path $path_i^{in}$ length($path_i^{in}$) ($path_k^{out}$ length($path_k^{out}$)) corresponding to $p_i^{2nd}$ ($s_k^{2nd}$) is 1:
    removing an added-in-first-model merge state of this path's single connection in the first model,
    and otherwise creating a connection from $p_i^{1st}$ to $o^{1st}$ (or from $o^{1st}$ to $s_k^{1st}$) in the first model and setting a merge state thereof to added-in-second-model.

According to certain example embodiments, it may be desirable to, between (b) and (c), determine whether the corresponding CPA is performed during conflict resolution and, if so, for every pair ($p_i^{1st}$, $s_k^{1st}$) with $p_i^{1st} \epsilon pred^{1st}$ and $s_k^{1st} \epsilon succ^{1st}$ for which there exists a connection $cxn^{1st}$ from $p_i^{1st}$ to $s_k^{1st}$ (or from $s_k^{1st}$ to $p_i^{1st}$) whose merge state is added-in-second-model, deleting this connection $cxn^{1st}$ and delete $cxn^{1st}$'s corresponding connection $cxn^{2nd}$ in the second model from $p_i^{2nd}$ to $s_k^{2nd}$ (or from $s_k^{2nd}$ to $p_i^{2nd}$) in the second model.

In certain example embodiments, a computer-implemented method of propagating changes made in a first computer-represented model to a second computer-represented model is provided. Input corresponding to at least one change to the first model is received, with the at least one change indicating that at least one object in the first model has been added and/or modified. At least one enablement check is performed to determine whether the at least one change can be propagated to the second model; and if so, the at least one change is propagated to the second model. The propagating comprises connecting the at least one object to at least one other object in the second model in accordance with at least one transformation pattern or rule.

In certain example embodiments, a modeling system for propagating changes made in a first computer-represented model to a second computer-represented model may be provided for carrying out this method.

Non-transitory computer readable storage mediums tangibly storing instructions for performing the above-summarized and/or other methods also are provided by certain example embodiments, as well as corresponding computer programs.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 15 shows example phases for New Element Change Propagation Actions (NCPAs) and Refinement Change Propagation Actions (RCPAs) in accordance with certain example embodiments;

FIGS. 22A-22B builds on FIG. 21, and provides an illustrative scenario that demonstrates the connection algorithm of certain example embodiments.

DETAILED DESCRIPTION OF EXAMPLE EMBODIMENTS OF THE INVENTION

Figure 1:
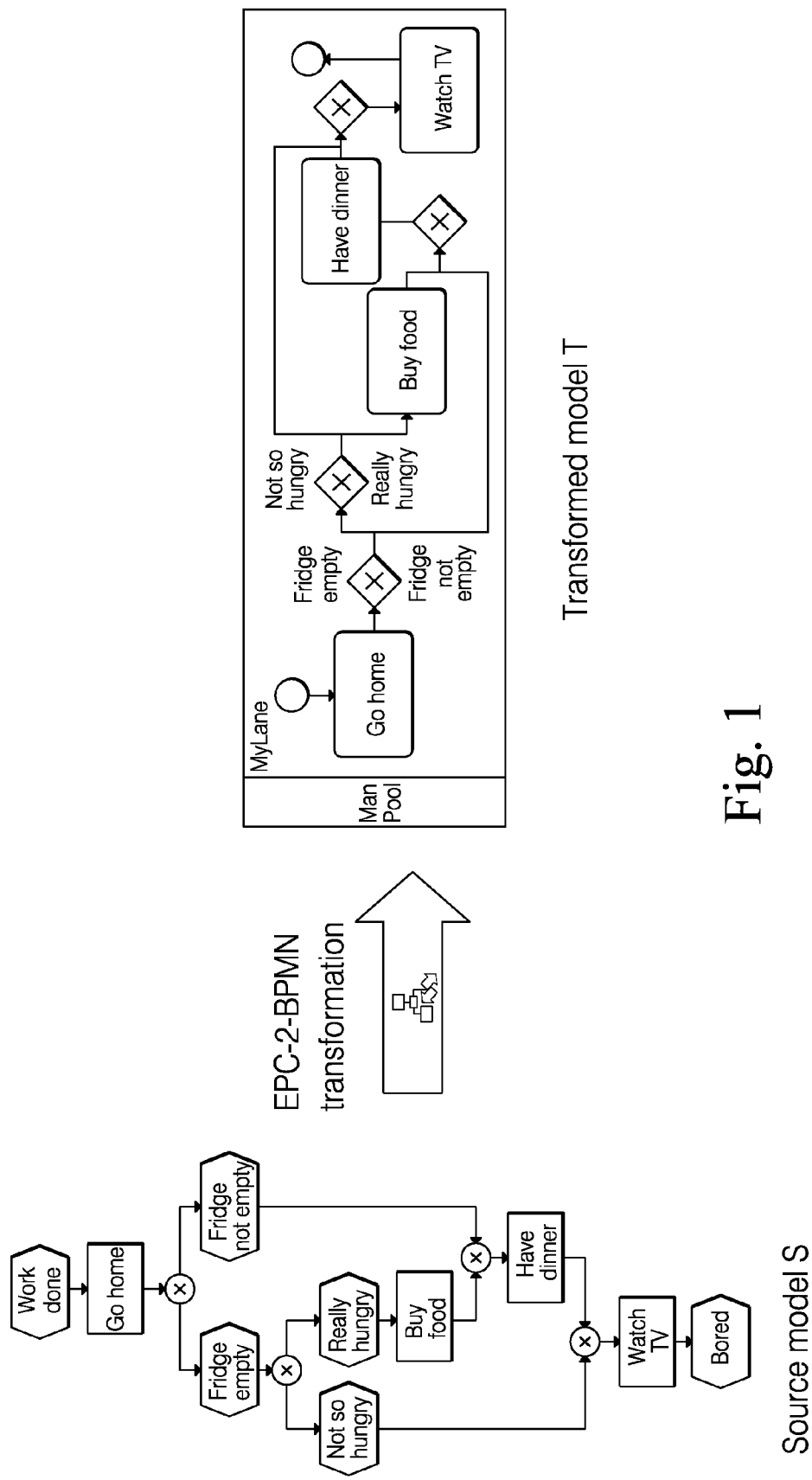
FIG. 1 is an illustration of an example EPC-2-BPMN transformation.

In some cases, it would be desirable to generate a technical process description (e.g., given as a BPMN or other model) from a business-oriented process description (e.g., given as an EPC or other model). This may in certain instances be implemented in connection with a model transformation framework (e.g., the ARTS model transformation framework) that allows for declaratively specifying the rules regarding how to translate models of one type into semantically equivalent models of another type.

Once the initial BPMN or other technical process description has been created by transforming the EPC or other business-oriented process description with a suitable EPC-2-BPMN or other transformation, both business-oriented process description and the technical process description may be changed independently of one another other. With the help of the interactive merge, it is possible to transform the modified business-oriented process description again and merge it with the changed technical model. That way, changes in the EPC or other business-oriented process description can be brought to the BPMN or technical model level without discarding changes to technical model, and vice versa. However, it is not always possible to bring changes made directly to the BPMN or technical model back to the EPC or business-oriented model if these changes are also relevant for the business perspective.

The "pull-up" approach of certain example embodiments allows the user to selectively invert the EPC-2-BPMN transformation on objects that were changed or added on BPMN level, that way creating corresponding objects in the EPC (or change existing objects in the EPC whose BPMN counterpart was modified so that they now reflect the changes in the BPMN model). The objects may be created so that they will later merge successfully with the BPMN object and not be reported as conflicts. While the details of the newly created objects sometimes may be specific to the respective use case and those of the transformation (and thus may be hard-coded in some instances), the framework for allowing the inclusion of pull-ups and the algorithms for properly connecting these new EPC objects to the rest of the EPC may be written in generic ways. It is noted that although the this example description uses a specific model transformation (EPC-2-BPMN) and usage scenario, the example techniques described herein are applicable to any kind of model-2-model transformation where a selective roundtrip scenario is to be supported.

The inventors of the instant invention have recognized that the problem of propagating changes from a transformation result model (e.g., the BPMN model in the example scenario above) to the transformation source model (e.g., the PEC in the example scenario above) can be understood as basically being a selective, partial inversion of a transformation (e.g., EPC-2-BPMN in the example scenario above) for some areas of the result model. The following discussion uses the terms "EPC model" and "source model" (or "BPMN model" and "target model", respectively) synonymously, for ease of reference. However, it will be appreciated that other modeling language may be used for the source and/or target model. It will be appreciated the general concept is not restricted to these specific two model types, or even to the domain of business process modeling. It is also not necessary that one of the models represents a "business" and/or the other a "technical" view on a matter at hand. Other pairs of model types could come from many different domains. For instance, it is possible to have a UML class diagram model representing the data structures of an application on the one hand and an Entity-Relationship diagram representing a high-level view of the database schema used to store the applications data on the other hand. Instead of transforming EPC to BPMN models, it would be possible to use other even more technical representations for processes, like the BPEL language or a variety of technical process description languages specific to a certain workflow management system. Another example embodiments also may be useful is the representation of data flows, as it is done, e.g., in so-called ETL (extract-transform-load) tools. Here, the user can use a usually graphical and ETL-tool-specific language to model how a data warehouse is loaded with data from the operational data sources. An active area of research is the development of common languages for describing these data flows. Again adopting the MDA paradigm to yet another domain, such a common data flow language could then be transformed into the different tool-specific languages, increasing portability and reducing the chances of vendor lock-in. An example for such a common data flow language is the operator-hub model, which can be translated into a variety of ETL languages (e.g., for IBM's InfoSphere DataStage, Oracle' Warehouse Builder etc.) or even equivalent SQL DDL expressions. Considering textual languages like SQL DDL as a type of "model" is not obvious. However, such a textual syntax is just one concrete syntax of the concepts of, the languages underlying concepts (i.e., the abstract syntax or metamodel). One can imagine a graphical representation of the textual syntax, e.g., a structure similar to an abstract syntax tree.

It is further also not always necessary for one model to be created by a declarative model transformation from the other. For instance, it is also possible that one model is created from the other using standard, imperative code. One could imagine that both models could have been built manually and/or in parallel. Basically, pairs of instances of any pair of model types that are initially synchronized by some means and should be kept in sync could benefit from the example techniques disclosed herein, as long as there are clear (but not necessarily unambiguous) rules (whether these are actually implemented as with our declarative model transformation, programmed out, or only informal best-practices) that specify how elements from one model should be translated to the other and back.

Figure 2:
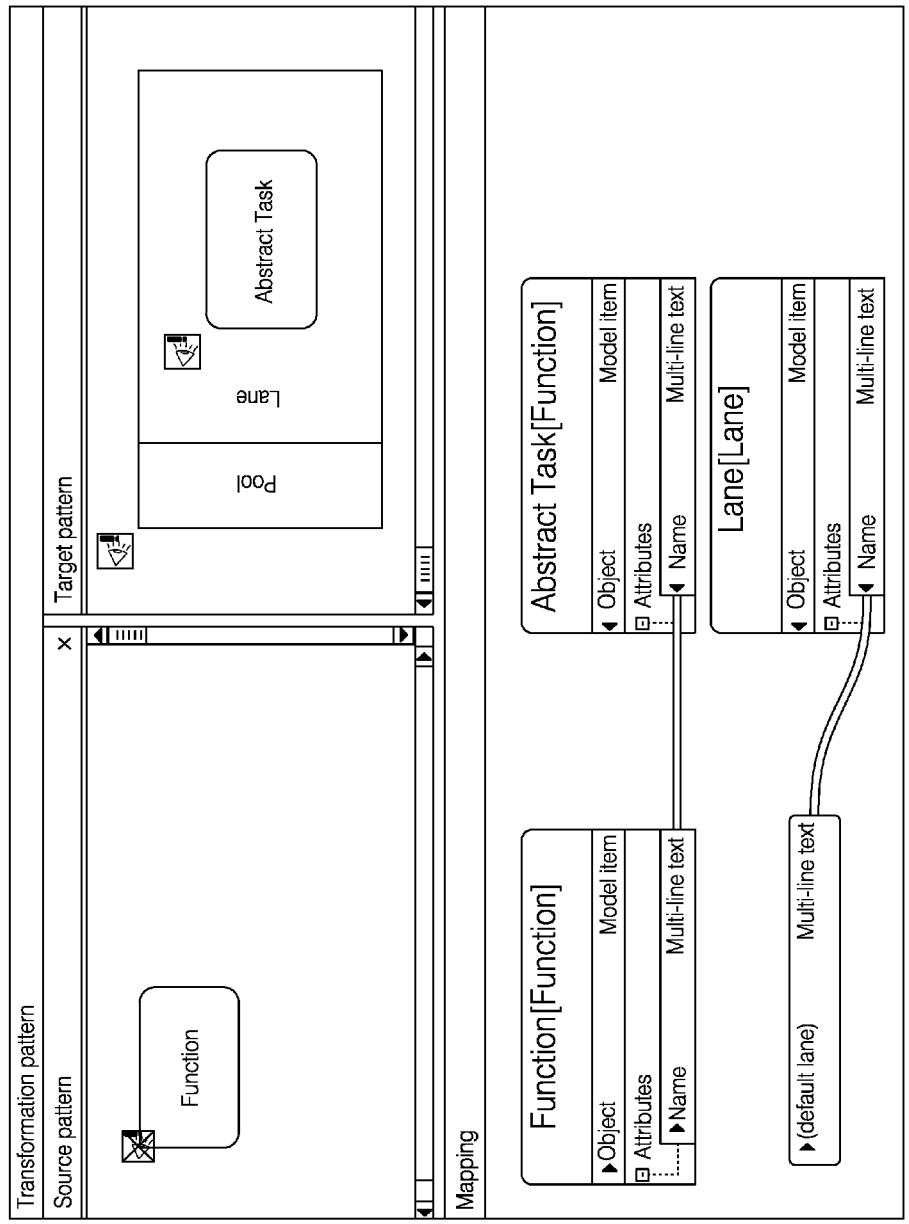
FIG. 2 is an example pattern for transforming a function to an abstract task.
Figure 3:
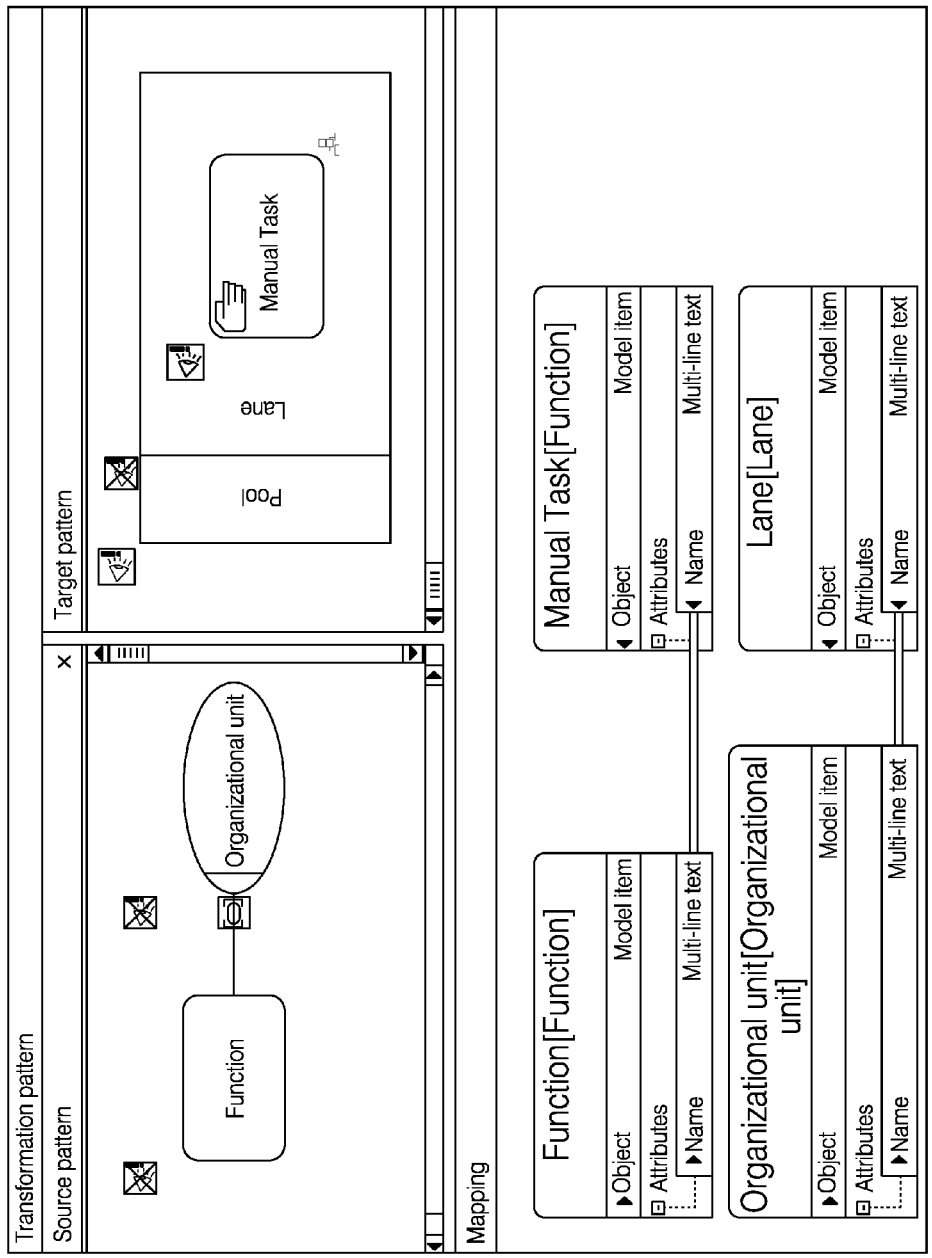
FIG. 3 is an example pattern for transforming a function with an organizational unit to a manual task.
Figure 4:
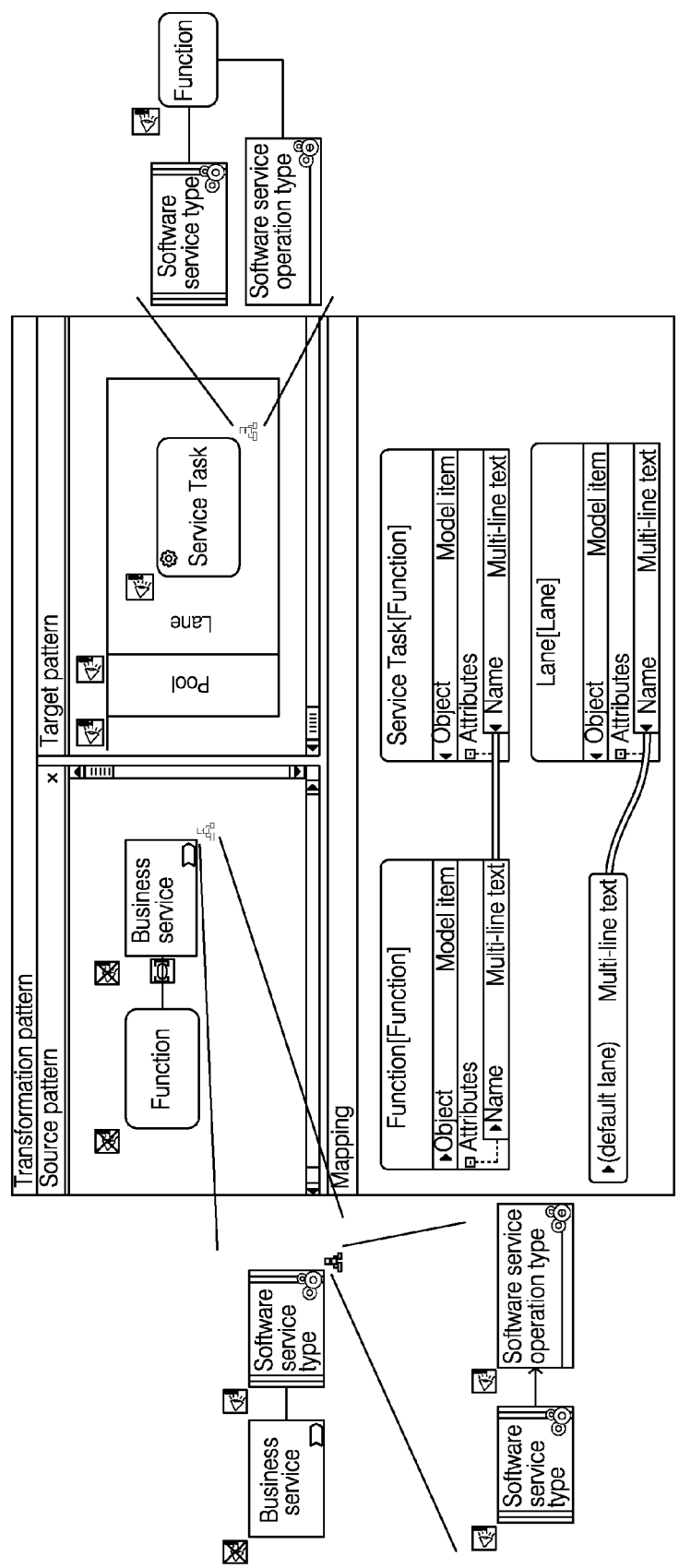
FIG. 4 is an example rule that creates a special kind of task based on a specific constellation of EPC elements.
Figure 5:
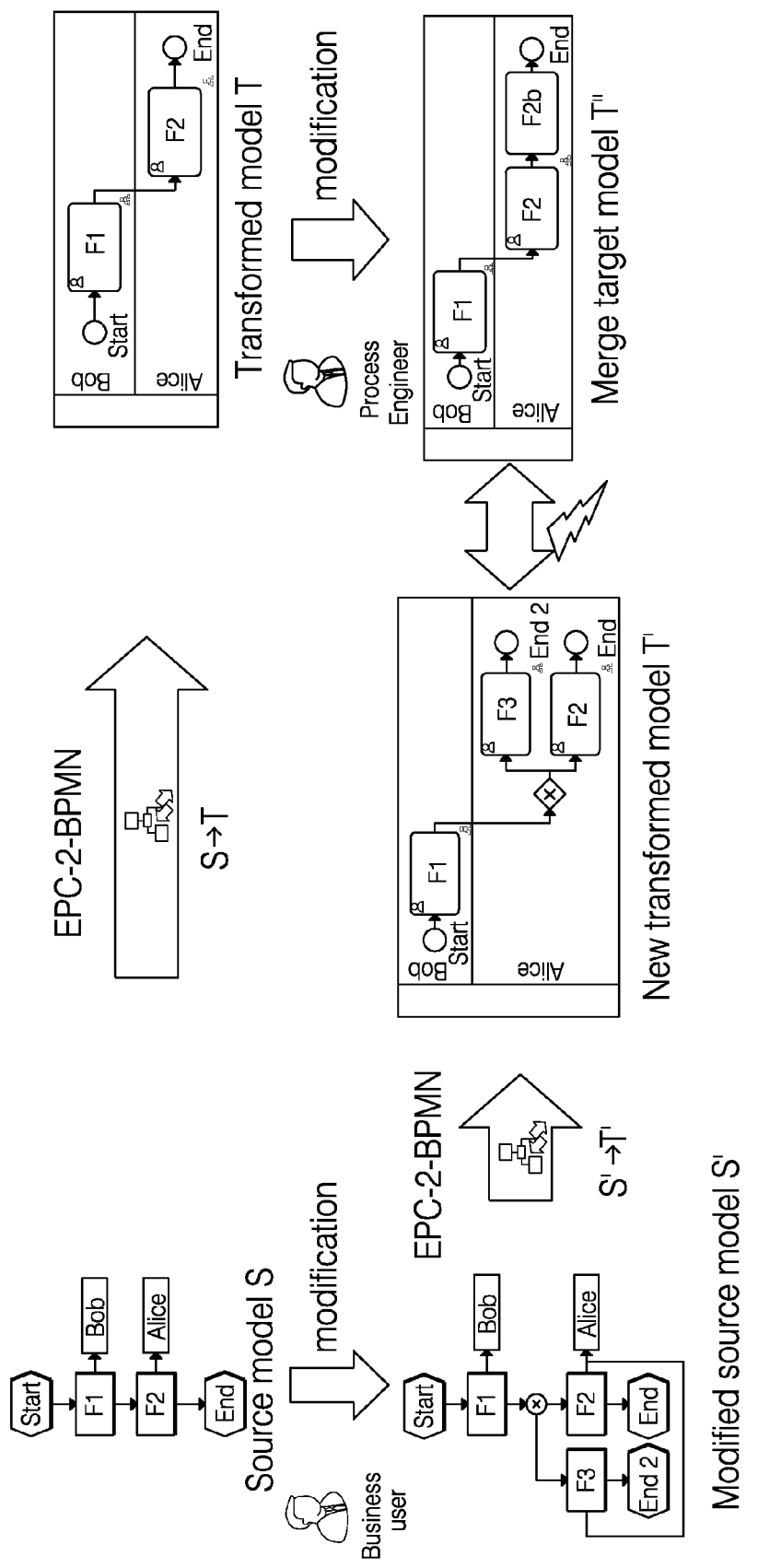
FIG. 5 shows how conflicts can arise from independent modification of a source model and a transformed model.
Figure 6:
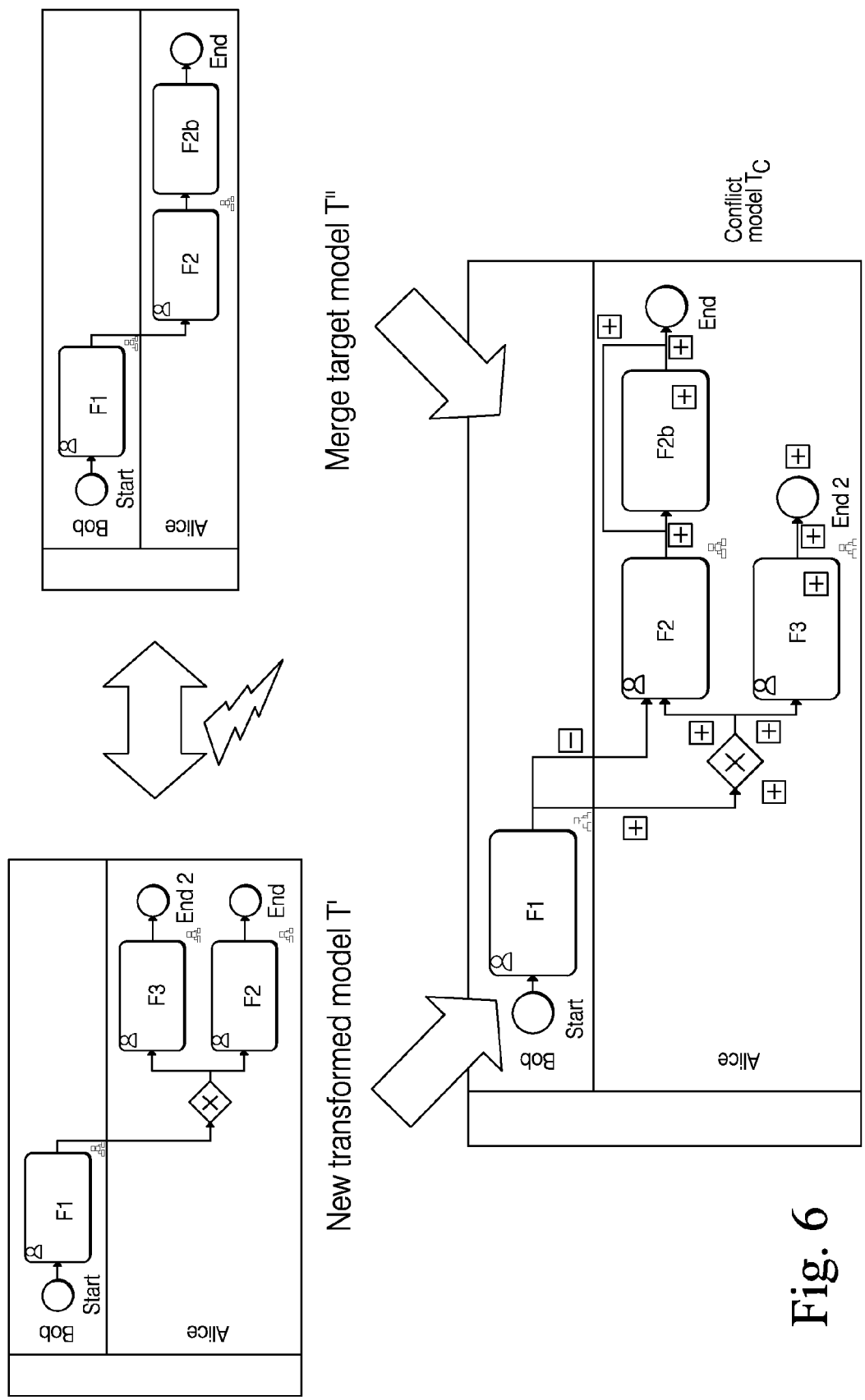
FIG. 6 is an example conflict model shown as a user interface paradigm for performing interactive conflict resolution.
Figure 7:
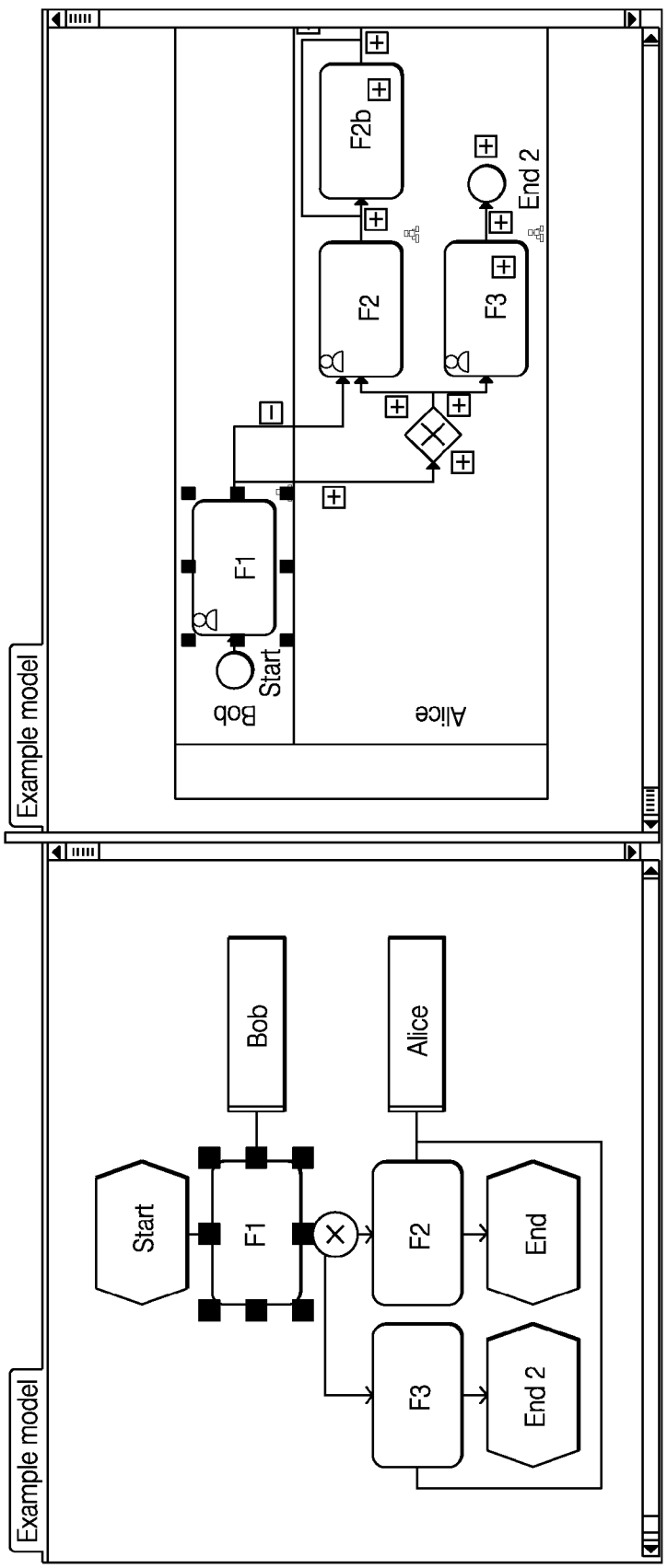
FIG. 7 is an example merge view.

While it might at first blush seem relatively straightforward to take the simplified patterns from FIGS. 2 to 4, simply exchange the roles of source and target pattern, and apply them on the new or changed BPMN objects that are to be propagated, this approach in general is not possible, as many individual patterns and the transformation as a whole are in general—in mathematical terms—not a bijective mapping between the domain of the source model type (all possible EPC models in this example case) and the domain of the target model type (all possible BPMN models in this example case). For instance, many EPC model elements have no direct counterpart in BPMN and therefore cannot be translated. Other EPC model elements have consciously been left out from the EPC-2-BPMN transformation because they model aspects of business processes that were found to be irrelevant for the technical view on a process. Further, different EPC models can result in equal BPMN models (e.g., if they differ only in aspects that are not transformed), and many mappings in the example patterns are not invertible if they involve mapping operators. For instance, even a common operation like the concatenation of two strings in general cannot be reverted.

Because of these restrictions, a fully generic approach to provide semi-automated support for users to perform change propagation is not believed possible. Certain example embodiments therefore provide an extension of the existing model transformation framework that allows for the simple creation and registration of explicitly defined change propagation actions (CPAs). These actions can be considered as being provided as integral part of a transformation definition. In general, each CPA directly corresponds to one pattern of the transformation (or a small number of patterns). For example, CPAs could be provided for propagating Abstract Tasks, Manual Tasks, or Service Tasks, which directly correspond to the example patterns in FIGS. 2-4, respectively. Other BPMN elements that could be propagated include, for example, all kinds of gateways, as well as start, end, and intermediate events. Either during interactive merge (e.g., as part of resolving the merge conflicts), or after all conflicts have been resolved, the user may be given the opportunity to apply CPAs on those elements of the conflict model (or the fully merged model) that have been added, modified, or deleted in BPMN.

To simplify the discussion and presentation of the examples below, an illustrative scenario is presented in which the user first resolves all conflicts in the conflict model $T_C$ and then begins with the propagation of changes with the resulting merged model $T_M$. However, as indicated above, other scenarios are possible, e.g., where the user resolves merge conflicts during an interactive merge operation.

In general, it is possible to distinguish between three basic categories of CPAs. A first category allows the propagation of target model elements that were newly added to the target model. These CPAs may be considered New Element CPAs (NCPAs). A second category handles modifications of elements that already have a corresponding element in the EPC. These CPAs may be considered Refinement CPAs (RCPAs). A third category allows a user to propagate deletions of elements in the target model. These CPAs may be considered Deletion CPAs (DCPAs).

CPAs can be structured into distinct phases, and FIG. 15 shows example phases for NCPAs and RCPAs in accordance with certain example embodiments. As can be seen from FIG. 15, some of the example phases are only relevant for RCPAs, and some phases differ as between NCPAs and RCPAs. These phases will be discussed in greater detail below.

A CPA's enablement check may include several components in certain example embodiments. First, not all CPAs registered will need to be made available to the user for any target model object. However, the set of registered CPAs may be filtered such that only those that "make sense" for a given added, modified, or deleted target model element are available for it. For example, the tool may not show a CPA meant for the propagation of manual tasks when working on a service task. Thus, it will be appreciated that the enablement check may include a filtering component in certain example embodiments.

Second, the enablement check of certain example embodiments may prevent a reapplication of CPAs such that, for example, a CPA is not available if the situation that the CPA would create in the source model already exists. This may help to reduce the likelihood of accidental reapplication of a CPA on the same element (which, if not properly taken care of, could sometimes lead to the inappropriate or undesirable duplication of elements in the source model). It also may be used to help prevent CPAs from running on those model elements in the target model that were created by the transformation and had not been modified since. These example aspects may be referred to as reapplication prevention. Consider, for example, the Abstract Task F1 in the FIG. 8 example scenario. This element had been created by the transformation from the EPC Function F1 and had not been modified in the BPMN model. Consequently, a CPA for the propagation of Abstract Tasks would not be made available for such an element.

Figure 16:
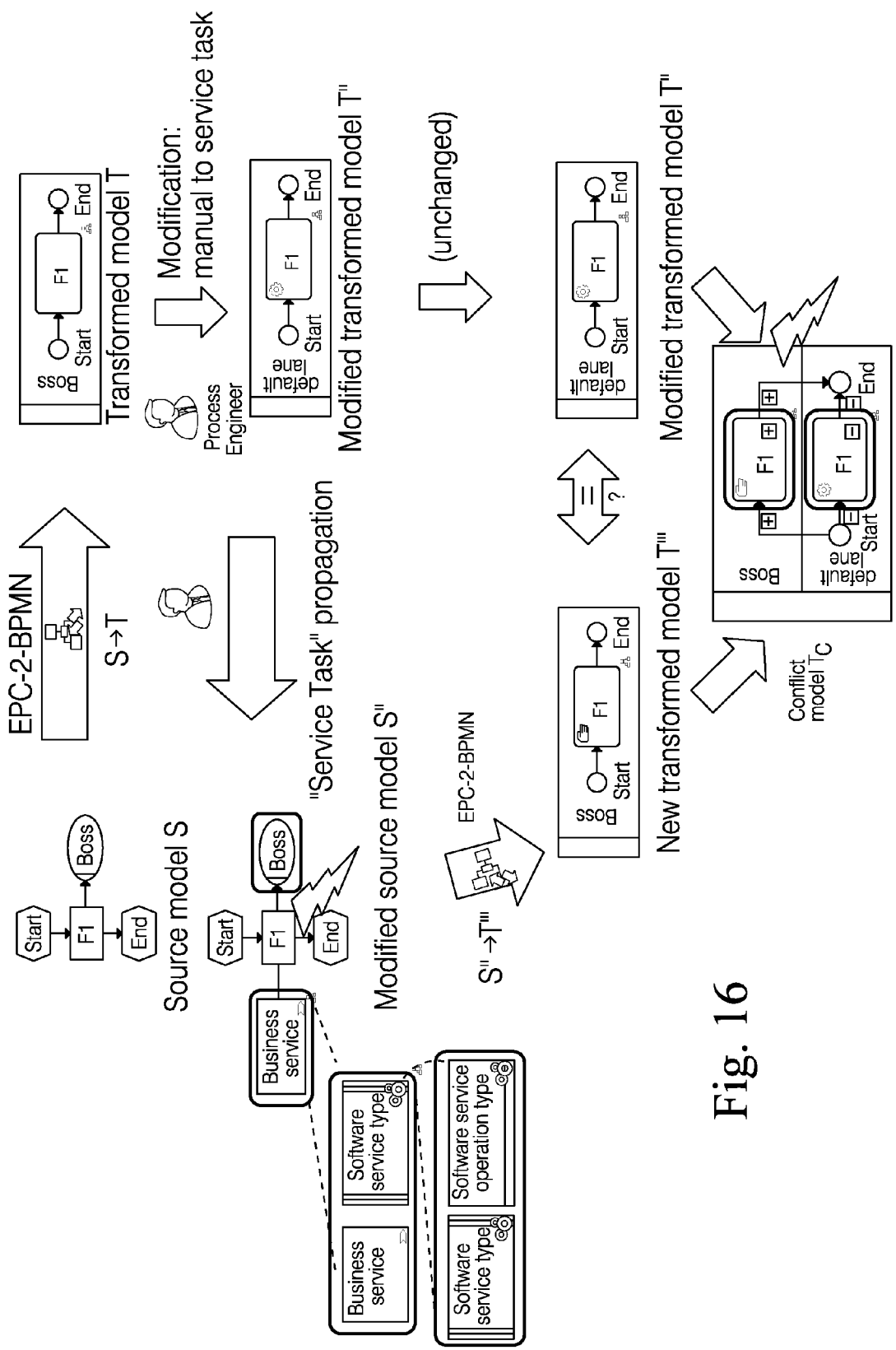
FIG. 16 shows an example propagation leading to ambiguities in the EPC, which can be detected as a part of a consistency check aspect in an enablement check in accordance with certain example embodiments.

A CPA's enablement check may in certain example embodiments additionally or alternatively include consistency checks/conflict prevention. This example aspect may involve checking whether the propagation would create an inconsistent situation in the source and target models. Without such checks, a propagation could lead to an ambiguous situation in the EPC. Referring once again to the FIG. 12 example, but assuming that instead of refining an Abstract Task into a Service Task, the user had instead changed a Manual Task that was created by the transformation out of an EPC function connected to an organizational unit into a Service Task, as shown in FIG. 16. If a "Service Task" propagation were allowed, this would lead to an EPC function that would be connected to both an organizational unit and a business service. As discussed above, in such a conflict situation, the EPC-2-BPMN transformation will create a Manual Task instead of a Service Task. The propagation would therefore not be successful, leading to a merge conflict as shown at the bottom of FIG. 16.

The enablement check may be separated into distinct levels in certain example embodiments. A first example level may only perform the reapplication prevention and the filtering discussed above. Any CPA that passes this check for a given object may then be shown as available to the user in whatever way this is handled by the user interface. This way, it is possible to show only those CPAs that would be expected by a user with a reasonable degree of understanding of how EPC elements are mapped to BPMN (and back). At the same time, this approach may help reduce the likelihood of accidental or intentional reapplication of CPAs.

A second example level enablement check may perform additional consistency checks. A CPA failing this check may not be simply hidden from the user, but instead may provide a list of reasons that can be conveyed to the user as feedback (e.g., as textual messages and/or graphical indications), informing the user why the otherwise "reasonable" CPA cannot be applied in the given situation.

This approach may help to provide an improved user experience, e.g., as compared to a situation that simply leaves the user in the dark as to why a CPA that would be expected to be available is not shown at all.

Furthermore, in certain example embodiments, instead of preventing the application of the CPA, the problems discovered during the consistency checks can also be conveyed as warnings that do not block executing the CPA but rather inform the user of possible problems. The problems reported can then be offered to the user interactively and may be subject to potentially iterative corrective actions in an optional correction phase (described in greater detail below).

Examples of how enablement checks of an "Abstract task" NCPA, a "Service task" RCPA, and a "Manual task" NCPA will now be provided, e.g., using natural language to provide illustrative descriptions of the conditions that may be checked. If the result of a condition is true, the next condition will be checked; otherwise, the check will be considered to have failed. In the following example descriptions, "B" refers to the object for which the enablement checks of the CPA are attempted.

Figure 10:
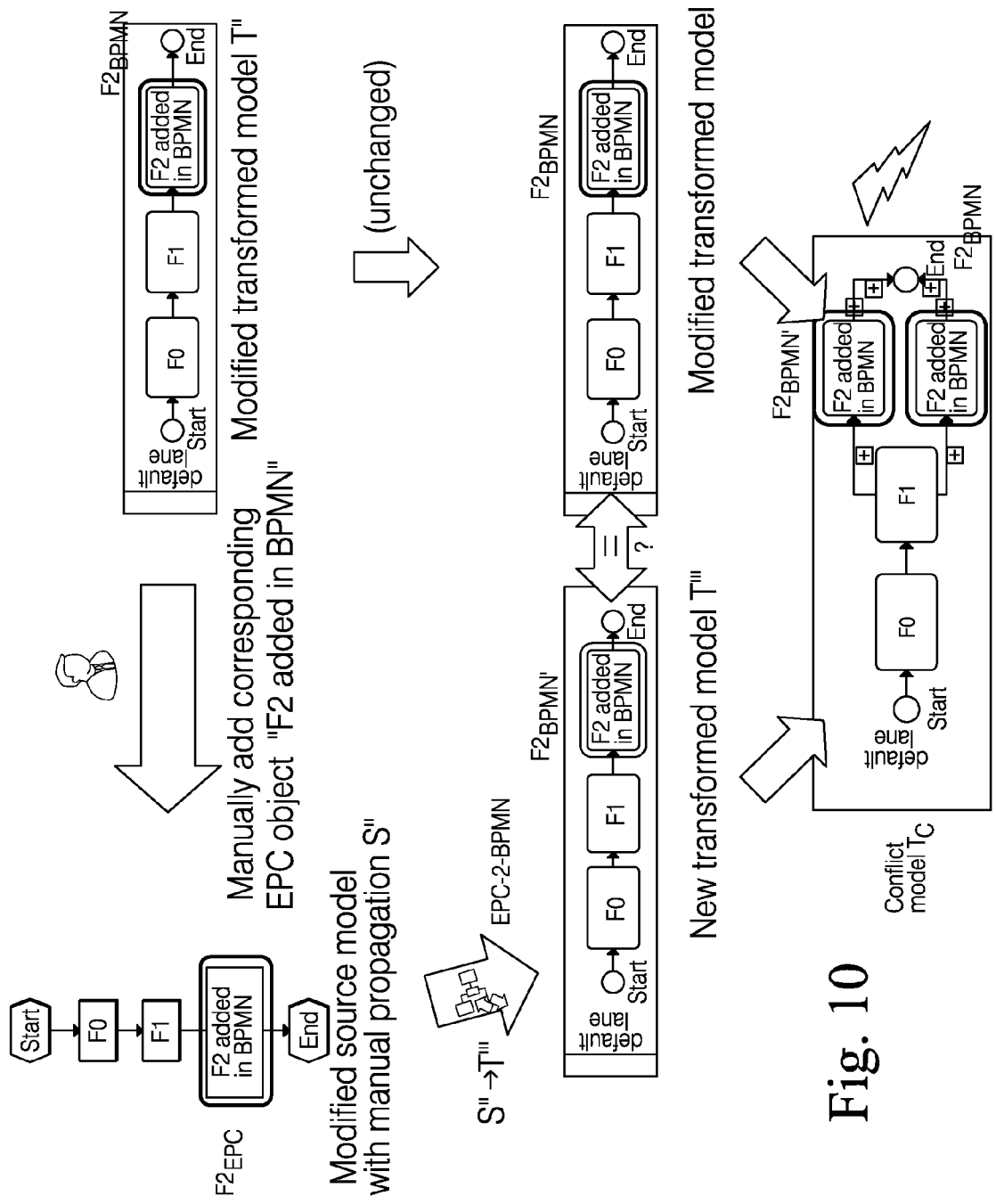
FIG. 10 illustrates how a user performing an interactive merge can manually perform a propagation of the BPMN-side addition of the abstract task "F2 added in BPMN" as in the FIG. 8 example.
Figure 11:
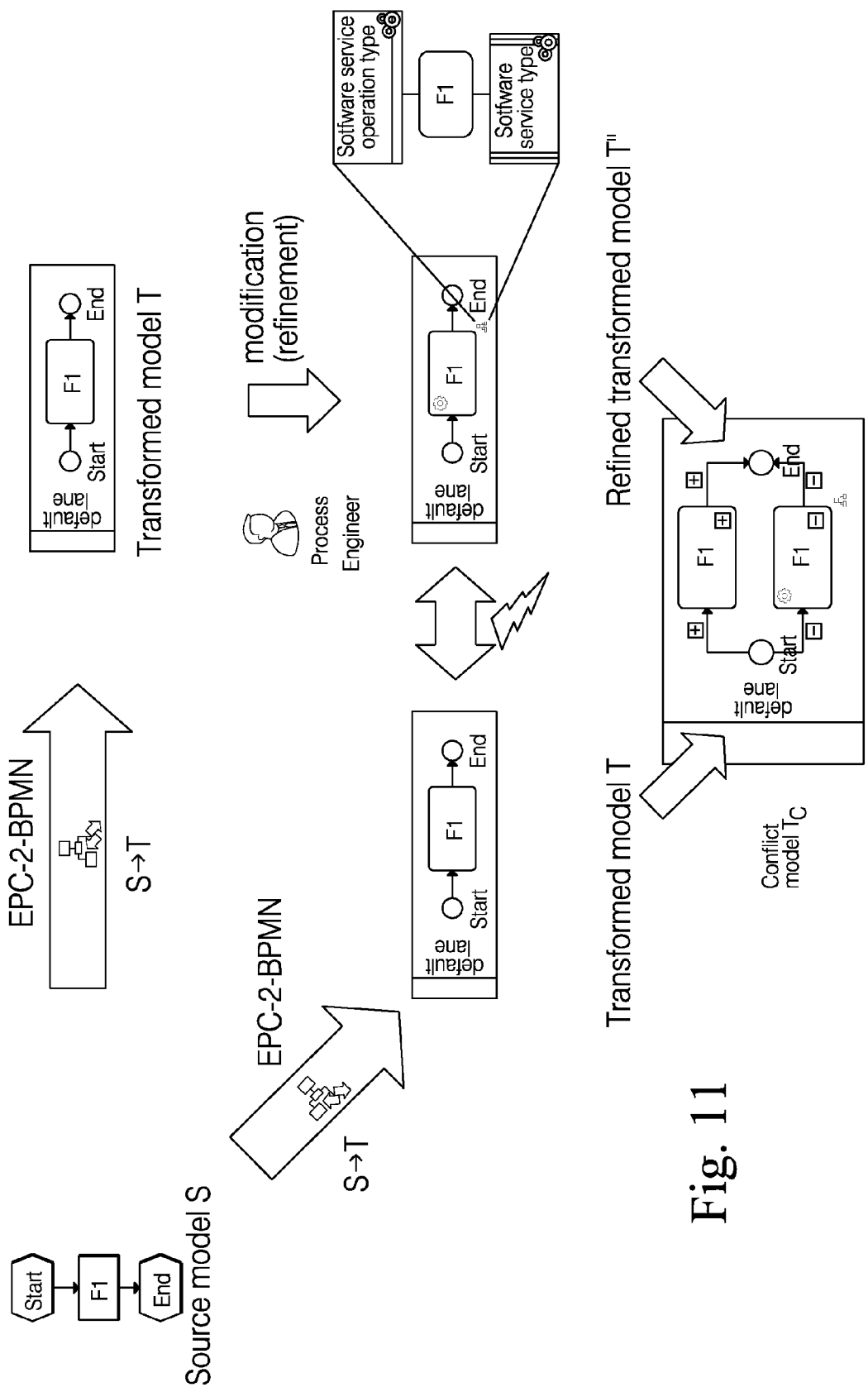
FIG. 11 shows a conflict being caused by a BPMN-side refinement made to a model element coming from a transformation.

The CPA for the propagation of Abstract Tasks into the EPC could be helpful in the FIG. 10 example situation. The following pseudo-code is an example enablement check for the "Abstract task" NCPA:

---

1) Level 1 check:
   a) Filtering
      • Is the symbol of B "Abstract task"?
      • Is B placed into the "default lane"?
   b) Reapplication prevention:
      • Does B not have a corresponding function E in the EPC?
2) Level 2 check: Conflict prevention [omitted for purposes of this example]

---

Figure 8:
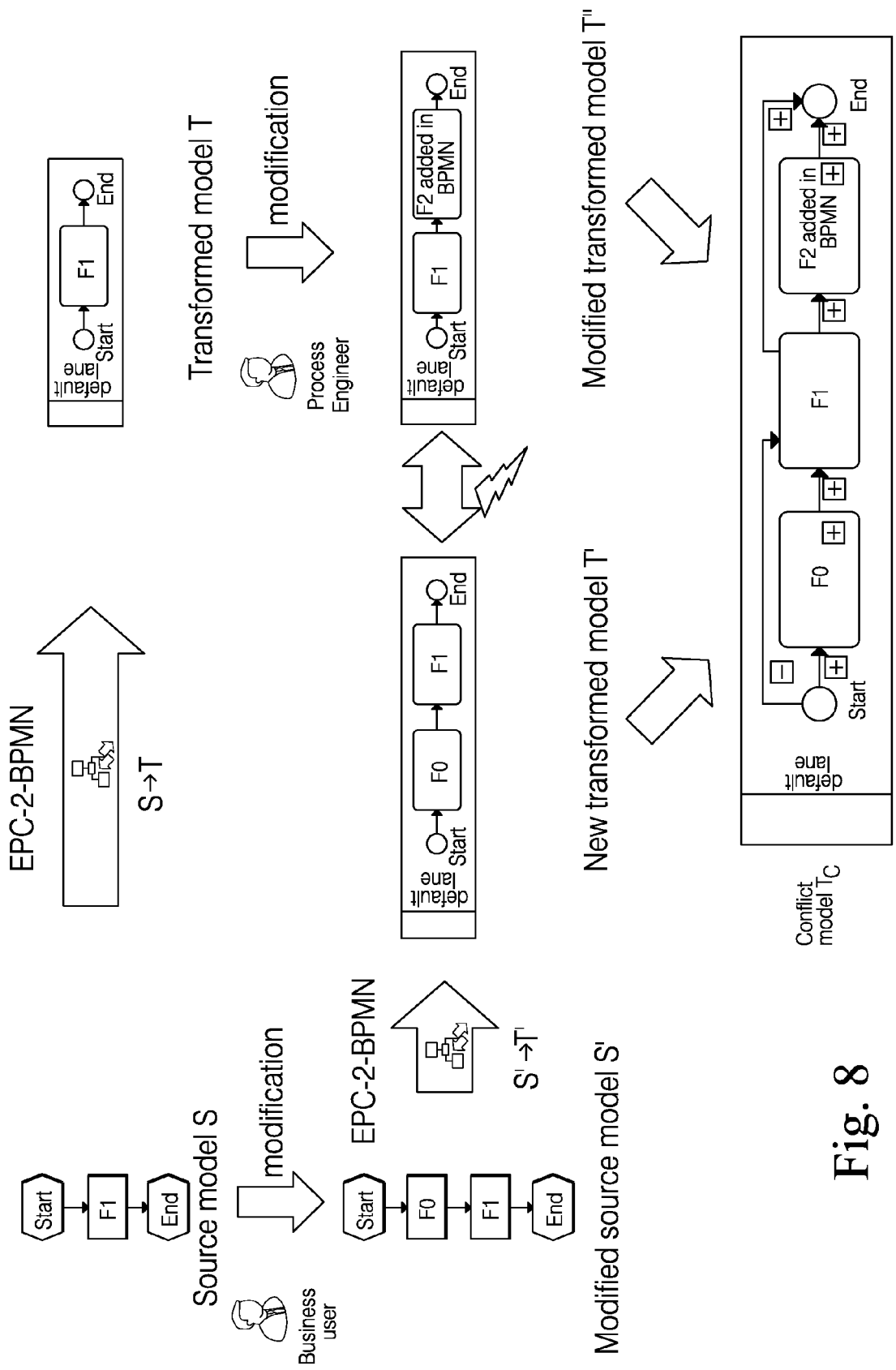
FIG. 8 shows an example of conflict resolution with high-level issues.
Figure 9:
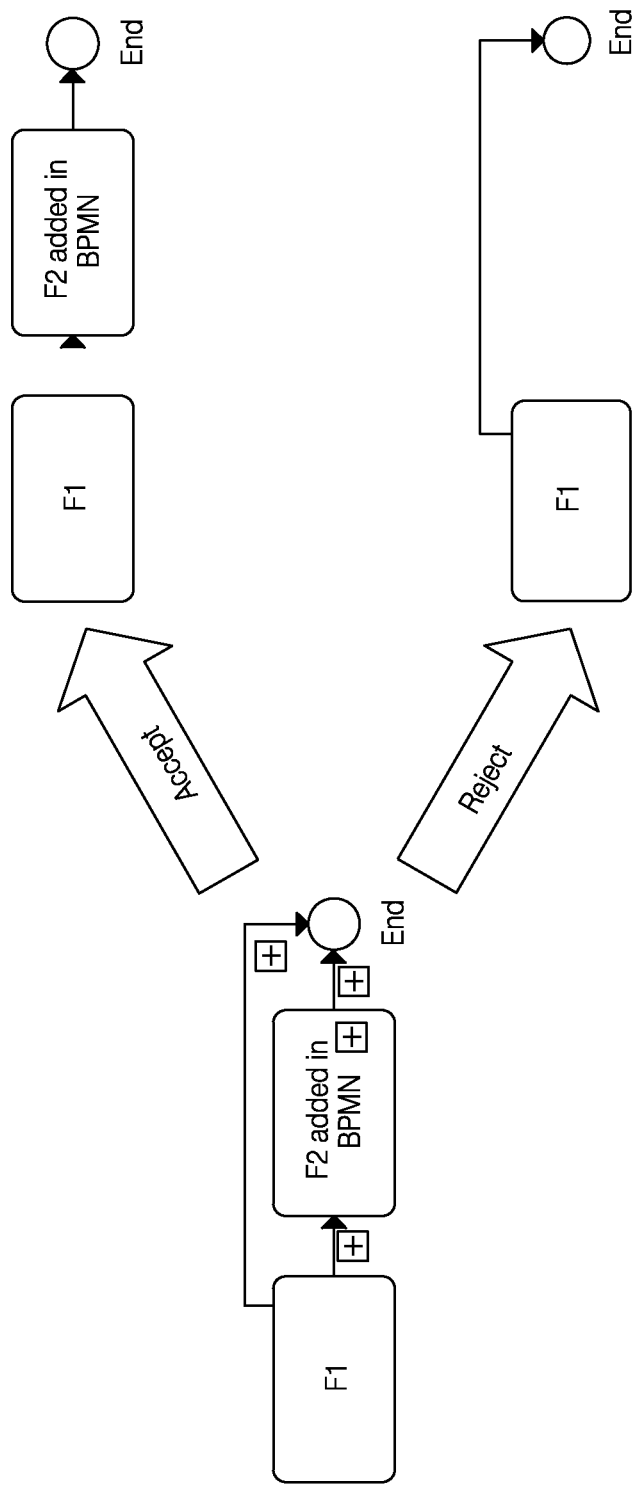
FIG. 9 demonstrates the options for resolving the "replacement in target" high-level conflict.

In the FIG. 8 example, both the filtering and the reapplication prevention checks would be true for "F2 added in BPMN." Consequently, the CPA would be shown as available to the user. Further, because the conflict prevention check is empty for this CPA, it can be applied.

Figure 12:
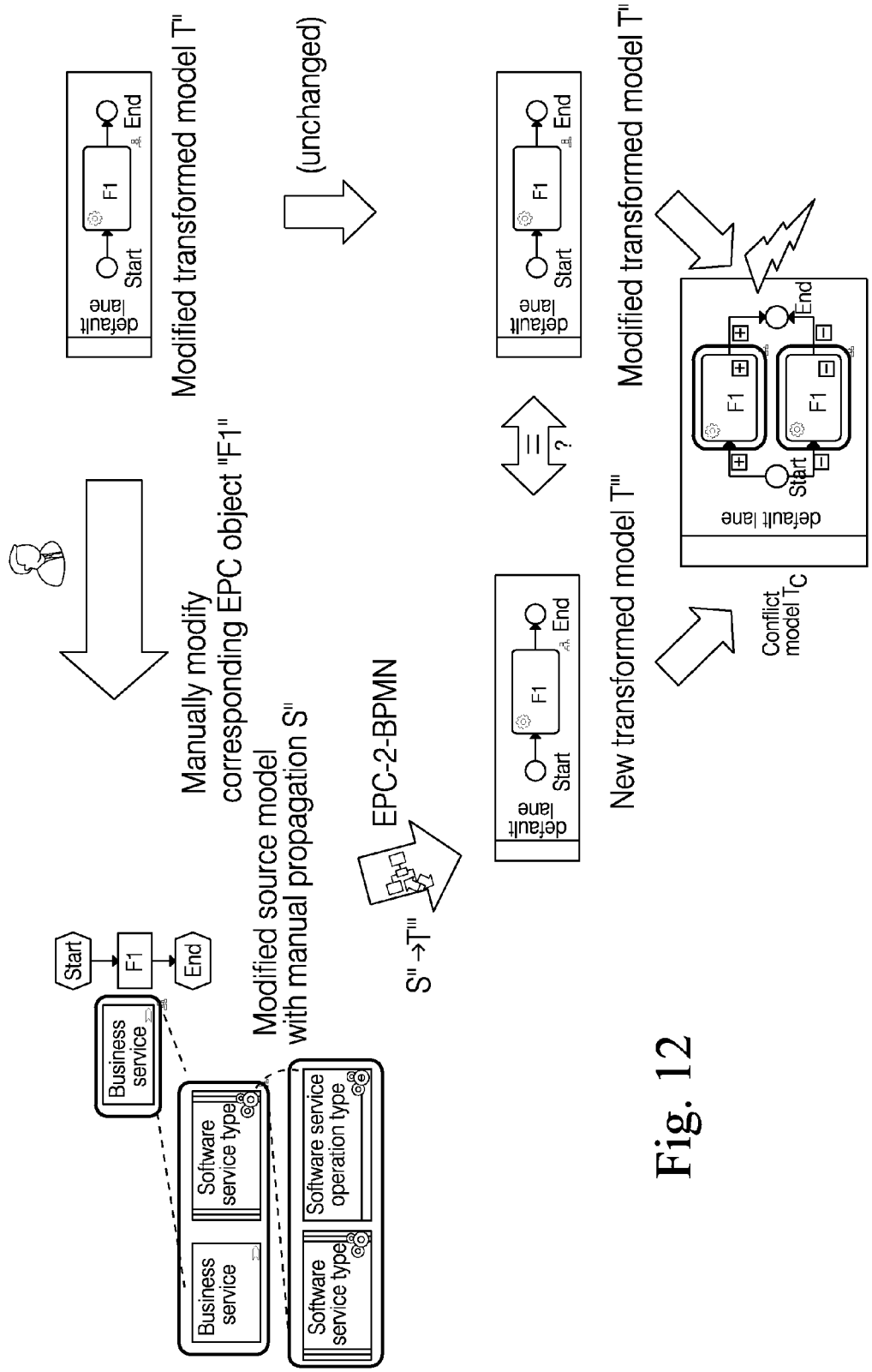
FIG. 12 shows an approach for manual propagation of BPMN-side refinements to the EPC.
Figure 13:
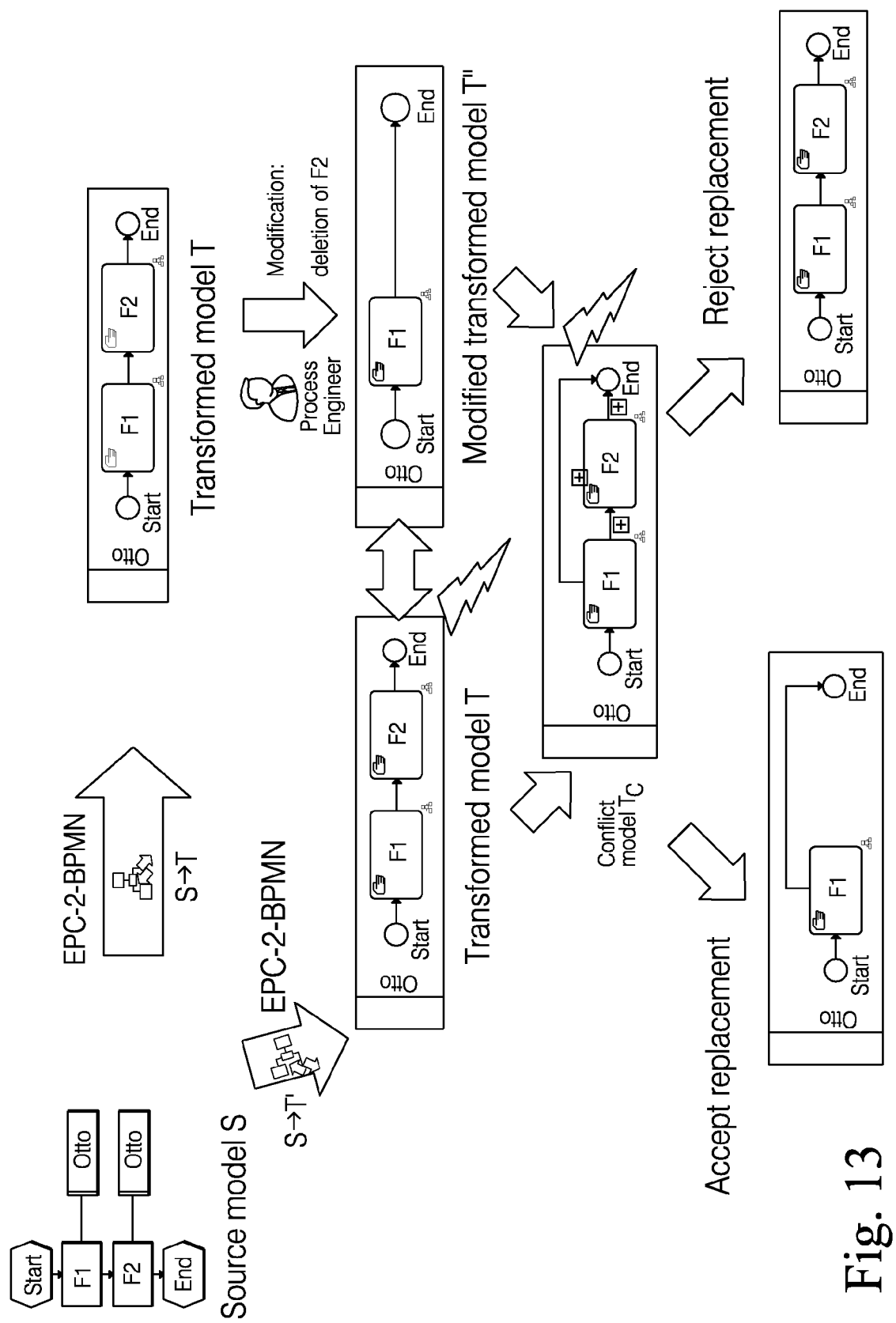
FIG. 13 is an example of a deletion on the technical level, and the resulting conflict model.
Figure 14:
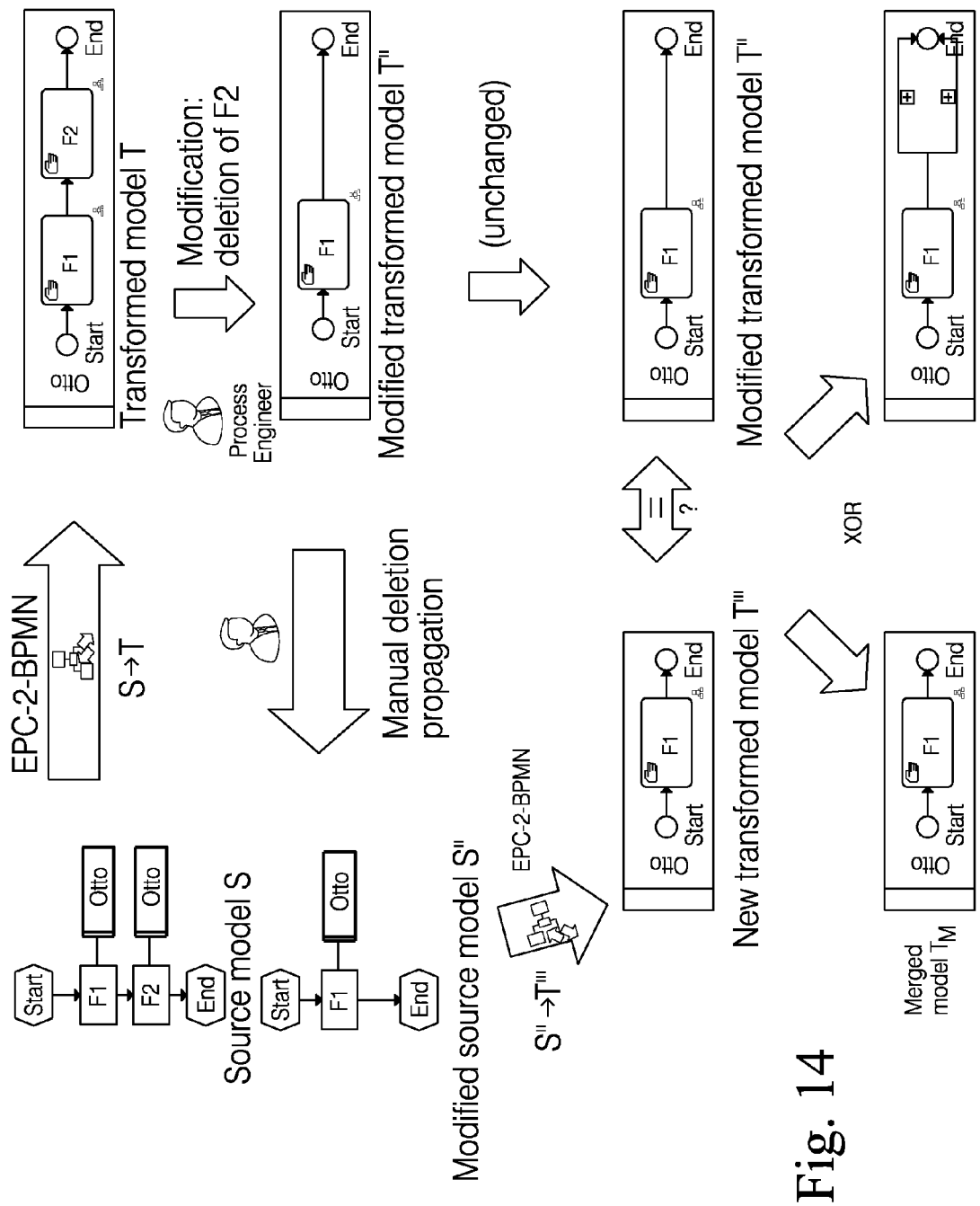
FIG. 14 illustrates what can happen when manually propagating deletion operations.

The second example propagation relates to a propagation of a refinement of any BPMN task into a service task, as illustrated, for example, in FIG. 12. The following pseudo-code may be used for an enablement check for a "Service task" RCPA.

---

1) Level 1 check:
   a) Filtering
      • Is the symbol of B "Service task"?
   b) Reapplication prevention
      • Does B have a corresponding function E in the EPC?
      • Is E not already connected to a business service object?
2) Level 2 check: Conflict prevention
   • Is B placed into the "default lane"?
   • Does B have an assignment A of type "Function allocation diagram" (FAD)?
   • Does model A contain an occurrence F of the same object definition B and is it using the Function symbol?
   • In model A, is there a software service operation type symbol connected to F with a connection of type "supports"?
   • In model A, is there a Software service type symbol connected to F with a connection of type "supports"?
   • Is E already connected to an organizational unit?

---

It will be appreciated that a large number of detailed checking regarding the correct contents of the assignment of B and the lane placement may be incorporated into the level 2 check. That way, the service task propagation may be made available even if the process engineer made some modeling "errors," and it becomes possible to return messages that inform the user of how the problem could be corrected if any of the level 2 checks fail. Depending on the details of the UI, for example, this feedback can be provided with textual messages, messages in conjunction with a highlighting of the problematic objects, and/or the like.

In the example propagation scenario from FIG. 12, the CPA would pass all Level 1 and Level 2 checks for the former Abstract Task F1 that has been refined to a Service Task and could be applied in this situation.

A third example of an enablement check considers the propagation of a newly added manual task. Based on the "Function with organizational unit to manual task" transformation rule from FIG. 3, the enablement check for such a propagation may include the following example conditions:

---

1) Level 1 check:
   a) Filtering
      • Is the symbol of B "Manual task"?
   b) Reapplication prevention
      • Does B not already have a corresponding function E in the EPC?
2) Level 2 check: Conflict prevention
   • Does B have an assignment A of type "Function allocation diagram" (FAD)?
   • Does model A contain an occurrence F of the same object definition B and is it using the Function symbol?
   • In model A, is there an organizational unit object OU connected to F with a connection of type "is carried out by"?
   • Is B placed into a lane whose corresponding source side object is an occurrence of the same definition underlying OU?

---

As before with the service task propagation, it is possible to perform the more detailed analysis of the situation in the target model in the Level 2 check, e.g., to be able to provide textual, graphical, and/or other feedback to the user as to why the propagation cannot be applied.

As alluded to above, CPAs may be able to create new or modify already existing source model element(s) in certain example embodiments. For instance, each CPA can be seen as an inverted transformation pattern. Those details of source model modification that are specific to a CPA are covered, at this point. However, aspects that can be handled generically are discussed below.

Figure 17:
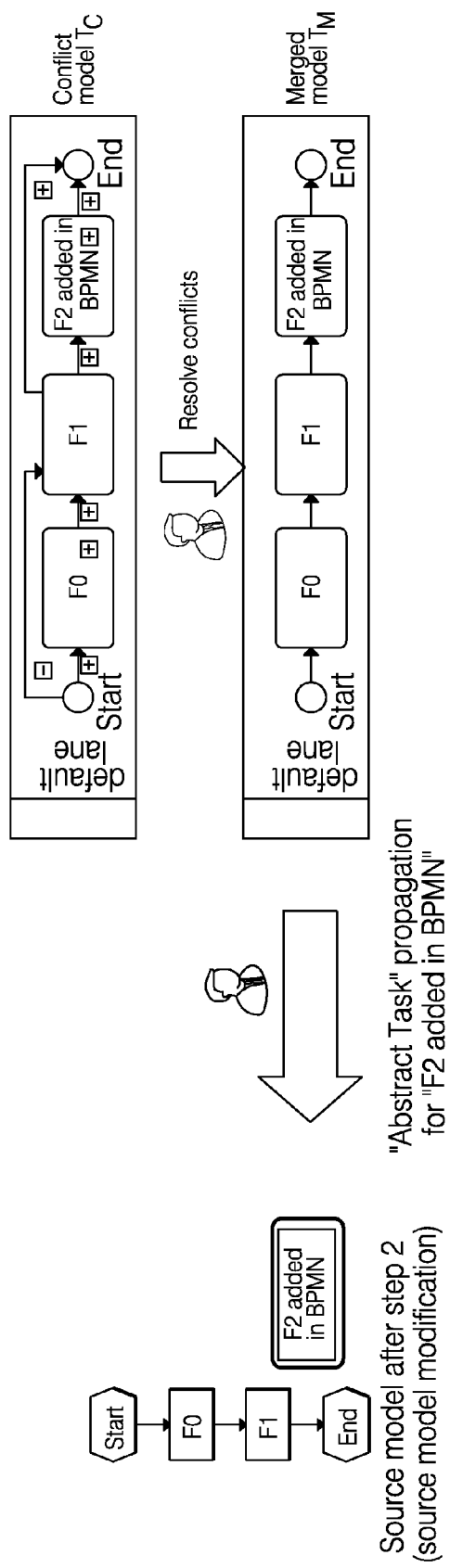
FIG. 17 builds on the FIG. 8 example, assuming that conflicts have been resolved, and involves applying an abstract task CPA on an object added to the source model in accordance with certain example embodiments.

With respect to the modification of the source model for the "Abstract task" NCPA, an example can be provided in connection with the example Abstract Task CPA discussed above. This example passed the enablement check. FIG. 17 continues where the example from FIG. 8 left off. It is assumed for the purposes of the FIG. 17 example that the user resolved all conflicts in the conflict model $T_C$ (by accepting both the "replacement in source" conflict involving F0 and the "replacement in target" conflict involving "F2 added in BPMN"), resulting in a successfully merged model $T_M$. The user then decides that "F2 added in BPMN" that had been added by the process engineer is relevant for the business view of our process. Having passed its enablement check, the user can now apply the abstract task CPA on this object. As a result, a new function with the same name as the task is created and placed into the source model. It will be appreciated that this new function is not yet connected to the rest of the EPC model.

Figure 18:
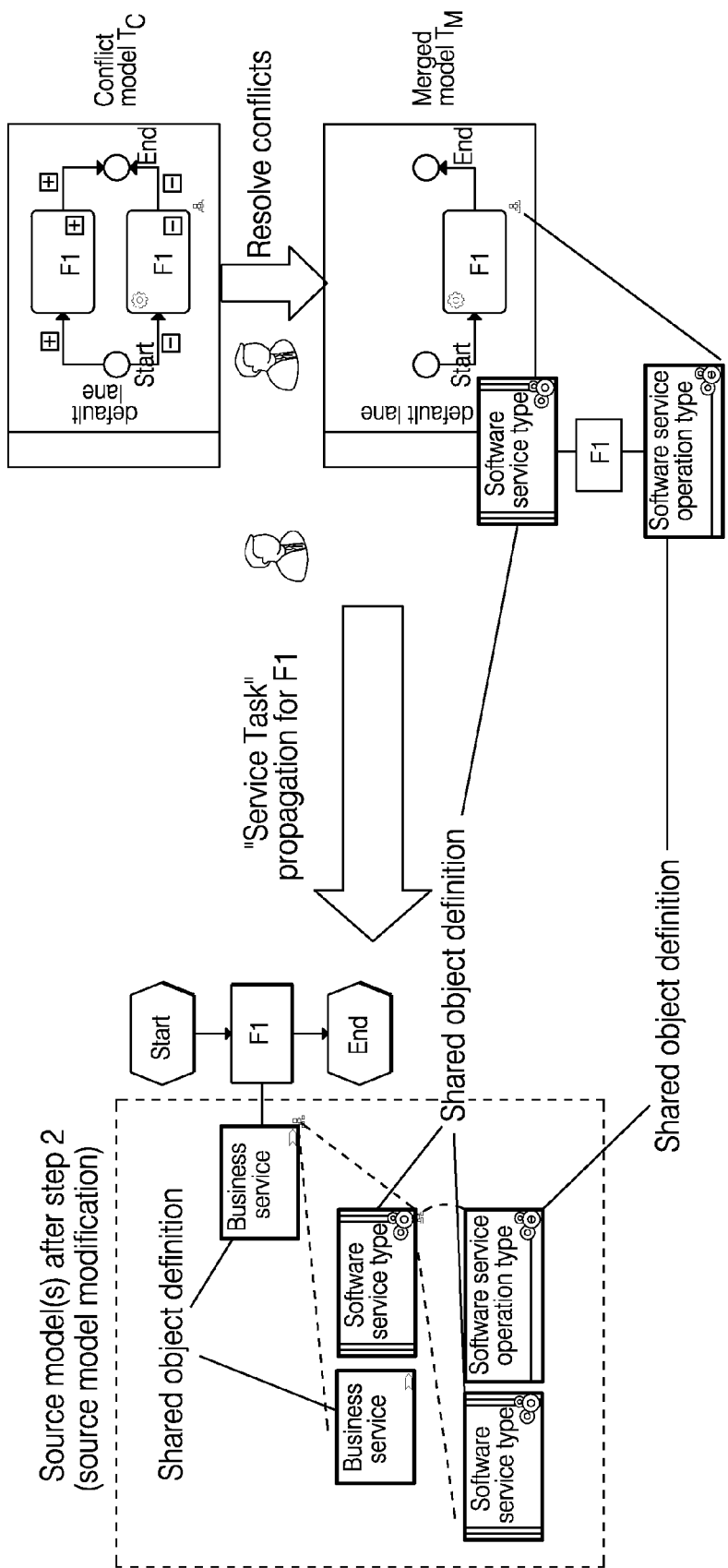
FIG. 18 shows the modifications of the source model as they would be performed by a service task RCPA in accordance with certain example embodiments.

FIG. 18 shows the modifications of the source model as they would be performed by a service task RCPA in accordance with certain example embodiments. As shown above, F1 passes the enablement check for the service task RCPA. After resolving the conflicts, the user can therefore apply it, which results in the creation of a new business service occurrence in the EPC, which is directly connected to the already existing EPC function F1. It will be appreciated that in contrast with the example above, this connection between the newly created element and the remainder of the EPC is already a part of this process, as this connection is a part of the source pattern of the "Function with business service to service task" pattern and not a part of the generic recreation of the process control flow. In addition, the assigned models shown in FIG. 18 are created, which correspond to the structure matched by our "Function with business service to service task" pattern. The software service type and the software service operation type objects placed into these assignments are occurrences of the same object definition used in the assignment on F1 on the target model, as indicated in FIG. 18.

As discussed above, it might also be desirable to sometimes propagate deletion operations from the technical level to the business level. Here, source model modification may include merely deleting the element(s) corresponding to the deleted element on the technical level.

Figure 19:
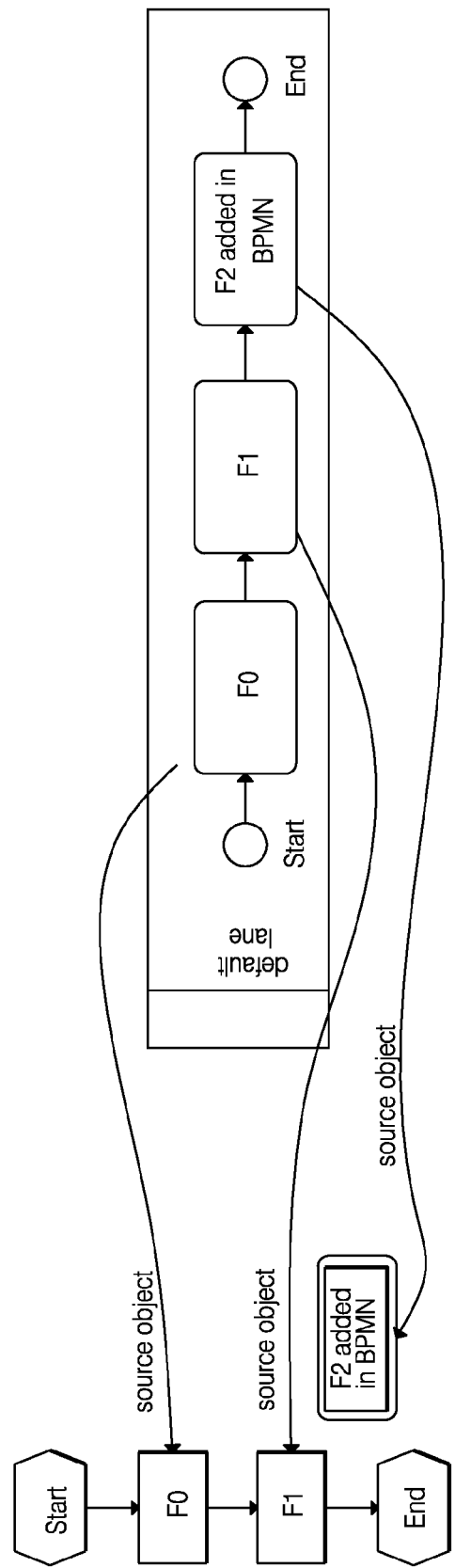
FIG. 19 shows the updating of trace information in accordance with certain example embodiments.

One aspect that poses a challenge to manual change propagation in practice was that manual change propagation cannot always properly update the internal transformation trace information of the target model elements. However, in certain example embodiments, the updating of trace information may be performed as a third step of applying a change propagation action. Once the respective source model elements have been created or updated, it is possible to set the target model elements to reference these elements as their source objects, e.g., as shown in FIG. 19, that way allowing the identity-based merge to succeed. The propagated target model element's list of patterns that it created may be further updated to include the pattern to which the respective CPA corresponds. Excluding connections for the time being, it becomes possible to obtain a state in the source and target model that is exactly as it would have been created by the transformation of the structures.

Certain example embodiments relate to the correction of modeling errors and conflicts in the source and target model. One challenge related to change propagation with CPAs is that in order for a merge of the propagated object(s) to work properly, the situation that was created by manual editing in the target model (e.g., the addition or refinement of model elements) should be precise as it will later be created by the transformation of the propagated elements. In the enablement check discussion above, it was assumed that such enablement checks would check in detail to make sure that all conditions were met. However, if done in this strict way, CPAs may likely fail their Level-1 or Level-2 enablement check and are therefore be unavailable or only partially available, e.g., after the user doing the propagation manually corrects the situation reported as error by the Level-2 check, respectively.

An alternative approach usable in connection with certain example embodiments involves allowing CPAs to not only modify the source model and update the trace information, but also to correct minor modeling "errors" that have been made in the target model that would prevent or reduce the likelihood of a successful merge. As an example, consider again the NCPA for a newly added manual task whose enablement check was discussed above. If the symbol is of the correct type, the assigned model exists and has the proper content, and task has been placed in the organizational unit's corresponding lane the CPA can be applied.

Figure 20:
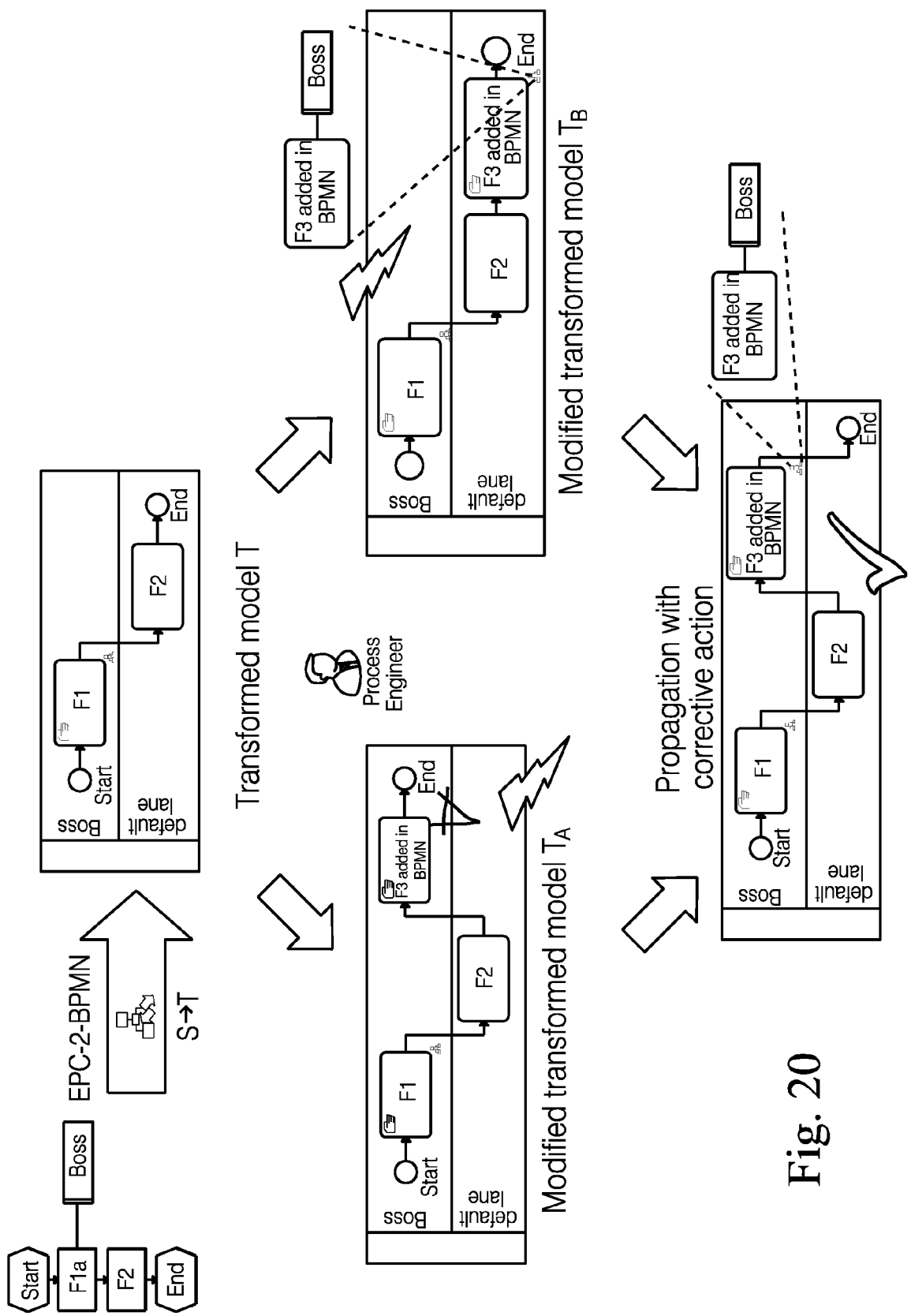
FIG. 20 is an example of a CPA with corrective actions being taken in the target model in accordance with certain example embodiments.

Assume now, however, that the process engineer either forgot to create the assignment (or some contents inside) as shown to the left of FIG. 20 or created the assignment, but accidentally placed the new manual task in the default lane instead of putting it into the already existing lane for the organizational unit as shown to the right of the same drawing. If the enablement check would still allow the manual task CPA to be performed in any of these situations, a conflict would raise upon a subsequent merge operation.

Instead of not allowing the change propagation and only delivering corresponding error messages, the CPA could easily perform the necessary corrective action in both situations, as the intention of the user is clear and unambiguous in this example. That is, in this example, both the placement of a manual task into a non-default lane or connecting the organizational unit object in the assignment make it clear who (e.g., which organizational unit) is to perform the task. Therefore the wrong lane placement can be corrected, the missing assigned model can easily be created, etc., as shown at the bottom of FIG. 20.

In certain example embodiments, corrective actions can also be taken in an interactive fashion if the modeling problem in the BPMN model cannot be resolved automatically and/or in a unique fashion. If, for example, the user had used one organizational unit OU1 in a manual task's assignment, but placed the manual task in the lane for another organizational unit OU2, the corrective action could in certain example instances prompt the user for input regarding how the problem is to be corrected.

In the example CPA steps discussed so far, connections between newly created source model elements and the remainder of the model have been created if those connections were an explicit part of the CPA's corresponding transformation rule's source pattern. Other connections, e.g., those representing the control flow of our EPC and BPMN processes, etc., have so far not been handled. Furthermore, in the examples discussed above, situations involved a single added-in-target object needing to be propagated, or propagated changes to objects that already existed in the source model. Consequently, in the examples above, additional connecting operations were either trivial or not necessary at all.

However, the connecting of the propagated element becomes more challenging when dealing with an entire group of objects to be added to a target model, rather than simply a single object that was added to the target model. Consider the example shown in FIG. 21. Here, the user added not one object, but an entire structure of connected objects (namely, Abstract Task "F1.1 AIT", Gateway "XOR AIT", Abstract Task "F1.2 AIT," plus several connections of these elements among each other and to the remainder of the model). Certain target model appears as the current state of the source model (e.g. after the propagation) as if it had just been transformed and merged.

An example connecting algorithm for added-in-target objects will now be provided. In the following description, for convenience, the source model is referred to as src, and the target model is referred to as tgt. As for convenience, the target model object that is being propagated is referred to as $o^{tgt}$, and the corresponding source model element that is created by step 2 of the propagation is referred to as $o^{src}$. The generic connection algorithm may proceed as follows:

---

1. Find the target-side border elements of $o^{tgt}$
   a. Find all outbound directed paths that start at $o^{tgt}$ and follow only added-in-target connections (e.g., these paths end at the first object that is not added-in-target, e.g., has a corresponding element in the source model). A directed path is any sequence of connections that "point or all point in the same direction." The length of such a path is the number of its connections, given by length(path). The set of these paths may now be referred to as $path^{out} = \{path^{out}_1, \ldots, path^{out}_n\}$, and the multiset of their end objects may be referred to as $succ^{tgt} = \{s^{tgt}_1, \ldots, s^{tgt}_n\}$ as $o^{tgt}$'s target model successors. It is noted that by using a multiset for the path's end (or start) nodes, it is possible to later handle those nodes that are reached along several paths individually for each path. Of course, it will be appreciated that cycles in these paths are not followed (e.g., no connection is used twice in a path).
   b. Find all inbound directed paths that start at $o^{tgt}$ and follow only added-in-target connections (in the inverse direction). The set of these paths may be referred to as $path^{in} = \{path^{in}_1, \ldots, path^{in}_m\}$, and the multiset of their start objects may be referred to as $pred^{tgt} = \{p^{tgt}_1, \ldots, p^{tgt}_n\}$ as $o^{tgt}$'s target model predecessors.
   c. The union of target model predecessors and successors $succ^{tgt} \cup pred^{tgt} = border^{tgt}$ for the set of $o^{tgt}$'s may be referred to as target model border objects.
2. Using the trace information, find the source-side elements corresponding to the target model predecessors $pred^{src} = \{p^{src}_1, \ldots, p^{src}_n\}$ and successors $succ^{src} = \{s^{src}_1, \ldots, s^{src}_n\}$.
3. Optional: If the CPA is performed during conflict resolution: For every pair $(p^{tgt}_i, s^{tgt}_k)$ with $p^{tgt}_i \in pred^{tgt}$ and $s^{tgt}_k \in succ^{tgt}$ for which there exists a connection $cxn^{tgt}$ from $p^{tgt}_i$ to $s^{tgt}_k$ (or from $s^{tgt}_k$ to $p^{tgt}_i$) whose merge state is added-in-source, delete this connection $cxn^{tgt}$ and delete $cxn^{tgt}$'s corresponding connection $cxn^{src}$ in the source model from $p^{src}_i$ to $s^{src}_k$ (or from $s^{src}_k$ to $p^{src}_i$) in the source model.
4. If the CPA is performed during conflict resolution, for each $p^{src}_i \in pred^{src}$ (each $s^{src}_k \in succ^{src}$):
   a. Create a connection from $p^{src}_i$ to $o^{src}$ (from $o^{src}$ to $s^{src}_k$) in the source model.
   b. If the length of the path $path^{in}_i$ length($path^{in}_i$) ($path^{out}_k$ length($path^{out}_k$)) corresponding to $p^{src}_i$ ($s^{src}_k$) is 1:
      remove the added-in-target merge state of this path's single connection in the target model
   else:
      create a connection from $p^{tgt}_i$ to $o^{tgt}$ (from $o^{tgt}$ to $s^{tgt}_k$) in the target model and set its merge state to added-in-source

--- example embodiments involve an algorithm that properly connects the new source model elements that will be created when the user propagates these new target model elements individually in an arbitrary order.

In certain example embodiments, regardless of the sequence in which the propagations are performed by the user (or which added-in-target elements are consciously chosen not to be propagated), the ultimately resulting source model structures may be identical and correctly reflect the connection structure in the target model. When performing the CPAs not after, but during the conflict resolution, the connecting algorithm of certain example embodiments may further help ensure that the source and conflict model state that result from the CPA are in themselves consistent, e.g., the state of the It will be appreciated that the optional step 3 effectively removes connections that have been removed in the target model (and which were re-added by the transformation and merge and therefore have the added-in-source merge state) and replaced with a structure of connected added-in-target objects. For more complex added-in-source structures that connect predecessor and successor objects, the decision whether or not to keep them may be left to the user.

Figure 21:
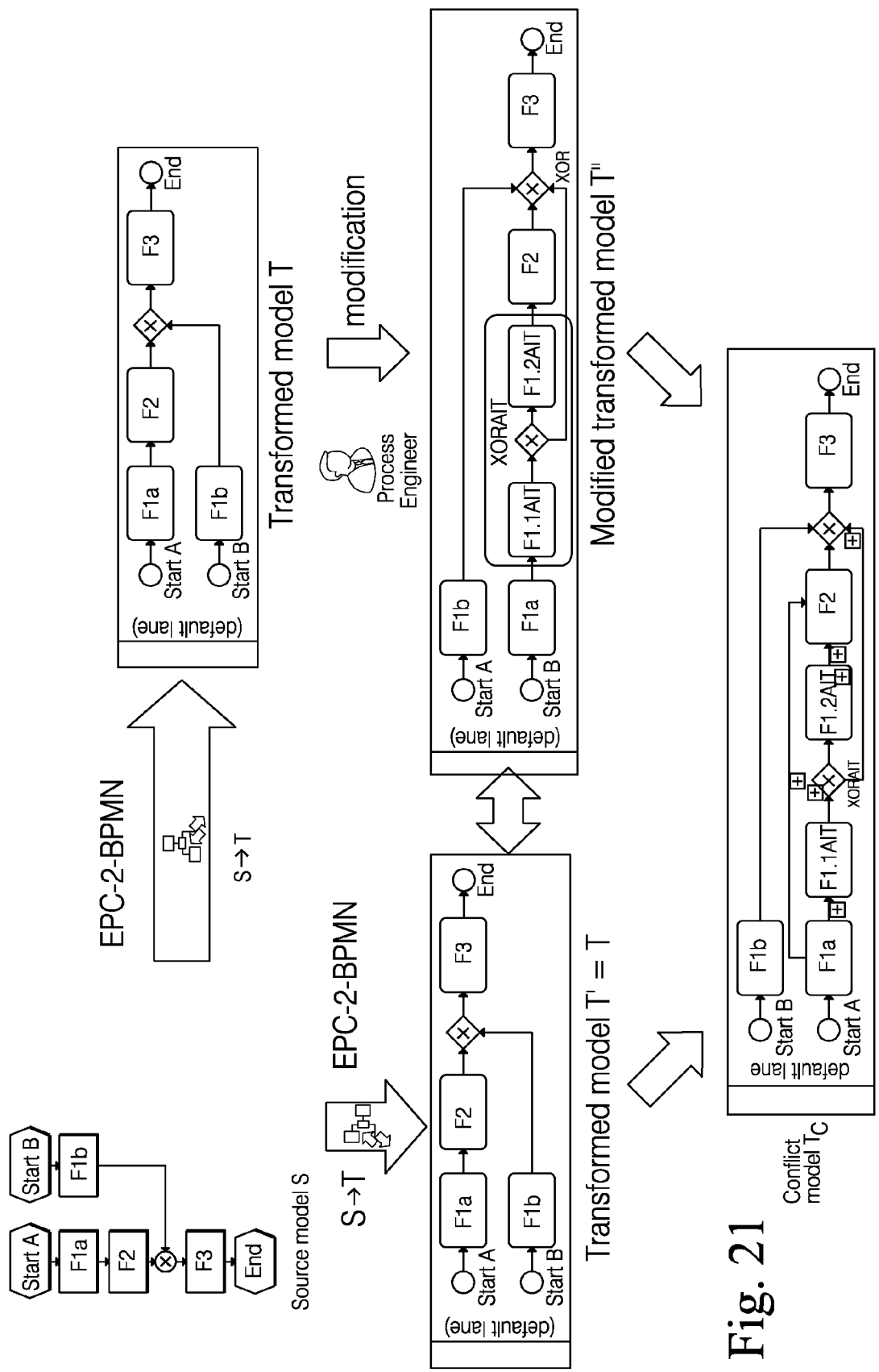
FIG. 21 shows a group of added-in target elements, some of which should be propagated, in connection with certain example embodiments.

FIGS. 22A-22B continue the example from FIG. 21. The first element propagated in this example is abstract task "F1.1 added in target"=$o^{tgt}$. After the creation of a like-named function $o^{src}$ in the source model and the updating of the trace information at $o^{tgt}$ to point to $o^{src}$ (steps 2 and 3), the connecting algorithm may be applied. In this example case, the connecting algorithm proceeds as follows:

---

1. Find the target-side border elements of $o^{tgt}$= F1.1 AIT
   a. outbound directed paths: $path^{out} = \{path^{out}_1 =$ F1.1 AIT → XOR AIT → F1.2 AIT → F2, $path^{out}_2 =$ F1.1 AIT → XOR AIT → XOR $\}$
      → successor elements: $succ^{tgt} = \{F2^{tgt}, XOR^{tgt}\}$
   b. inbound directed paths: $path^{in} = \{path^{in}_1 =$ F1.1 AIT ← F1a$\}$
      → predecessor elements : $pred^{tgt} = \{F1a^{tgt}\}$

```
2. Find source-side border elements:
    succ^src = {F2^src, XOR^src}
    pred^src = {F1a^src}
3. Delete added-in-source connections between predecessors and successors in both
    source and target model:
    Delete connection F1a → F2 in EPC and BPMN
4. Create / Keep connections for paths in source and target model:
    path^out_1: Create connection F1.1 AIT → F2 in EPC and BPMN, mark as added-in-
        source in BPMN
    path^out_2: Create connection F1.1 AIT → XOR in EPC and BPMN, mark as added-in-
        source in BPMN
    path^in_1: Create connection F1a → F1.1 AIT in EPC, remove added-in-target marker
        from existing connection in BPMN
```

The source model S' and the conflict model $T_C'$ is obtained as a result, as shown in FIGS. 22A-22B. As can be seen from FIGS. 22A-22B, $T_C'$ is in the exact state that would have been obtained if "F1.1 AIT" had always been a part of the source model S', if only F1.2 AIT and XOR AIT had been added to the target model, and if the merge had then been performed.

As a next step, the "Abstract Task" propagation is performed on the added-in-target Abstract Task "F1.2 AIT" ($o^{tgt}$="F1.2 AIT"), which results in the creation of a corresponding function o' in the source EPC. The example connecting algorithm is again applied to connect this function with the remainder of the model:

```
1. Find the target-side border elements of o^tgt = F1.2 AIT
    a. outbound directed paths: path^out = {path^out_1 = F1.2 AIT → F2}
        → successor elements: succ^tgt = {F2^tgt}
    b. inbound directed paths: path^in = {path^in_1 = F1.2
        AIT ← XOR AIT ← F1.1 AIT}
        → predecessor elements : pred^tgt = {F1.1 AIT^tgt}
2. Find source-side border elements:
    succ^src = {F2^src}
    pred^src = {F1.1 AIT^src}
3. Delete added-in-source connections between predecessors and
    successors in both source and target model:
    Delete connection F1.1 AIT → F2 in EPC and BPMN
4. Create / Keep connections for paths in source and target model:
    path^out_1: Create connection F1.2 AIT → F2 in EPC, remove
        added-in-target marker from existing connection in BPMN
    path^in_1: Create connection F1.1 AIT → F1.2 AIT in EPC and BPMN,
        mark as added-in-source in BPMN
```

The result of this propagation is shown as source model S" and conflict model $T_C$" in FIGS. 22A-22B. Again, S" and TC" are in the state as if the initial transformation had been done with S", the user had only added XOR AIT (and its incident connections) to the BPMN model, and then performed the merge.

The Gateway "XOR AIT"=$o^{src}$ is now ready to be propagated. Again, steps 2 and 3 create a corresponding source model object (an EPC XOR gateway=$o^{tgt}$) and set the trace information accordingly. The connection algorithm is again applied:

```
1. Find the target-side border elements of o^tgt = XOR AIT
    a. outbound directed paths: path^out = {path^out_1 = XOR AIT → F1.2 AIT, path^out_2 =
        XOR AIT → XOR}
        → successor elements: succ^tgt = {F1.2 AIT^tgt, XOR^tgt}
    b. inbound directed paths: path^in = {path^in_1 = XOR AIT ← F1.1 AIT}
        → predecessor elements : pred^tgt = {F1.1 AIT^tgt}
2. Find source-side border elements:
    succ^src = {F1.2 AIT^src, XOR^src}
    pred^src = {F1.1 AIT^src}
3. Delete added-in-source connections between predecessors and successors in both
    source and target model:
    Delete connection F1.1 AIT → F2 in EPC and BPMN
    Delete connection F1.1 AIT → XOR in EPC and BPMN
4. Create / Keep connections for paths in source and target model:
    path^out_1: Create connection XOR AIT → F1.2 AIT in EPC, remove added-in-target
        marker from existing connection in BPMN
    path^out_2: Create connection XOR AIT → XOR in EPC, remove added-in-target marker
        from existing connection in BPMN
    path^in_1: Create connection F1.1 AIT → XOR AIT in EPC, remove added-in-target
        marker from existing connection in BPMN
```

As a result, a fully resolved target BPMN model $T_C'''=T_M$ is obtained, where all objects that were added-in-target were successfully propagated to the source EPC model.

Having now provided examples that demonstrate the selective change propagation concept of certain example embodiments, the discussion below provides an illustrative embodiment of some of the generic aspects of this concept. Because the enablement check, source model modification, and optional corrective steps may sometimes be specific to the respective CPAs, the discussion below focuses on the more generic aspects of the approach of certain example embodiments including, for example, the connecting algorithm.

The generic connection algorithm of certain example embodiments will now be explained with a simplified, Java-like pseudo-code syntax. Throughout the pseudo-code snippets below, a simplified object model is used to represent models, objects, and connections. A selection of helper functions also are provided. Where the semantics of these helper functions are not apparent from their naming, they are explained informally in the following section. It also is assumed for the purposes of these example code snippets that a canonical set of primitive data types (e.g., Boolean, int, String, etc.) and a number of abstract data types (e.g., lists, sets, maps, iterators, etc.) can be accessed and modified with the usual (and self-explanatory) techniques. Aspects like error handling are omitted from these example snippets for clarity, although certain example embodiments may indeed include error handling throughout the various functions.

An example simple object structure for models and model elements will now be provided:

MergeState is an enumeration of all possible merge states an individual model element can have. In this example, the values ADDED_IN_SRC (represented graphically with a green plus symbol in our example figures), DEL_IN_SRC (represented graphically with a red minus symbol), and ADDED_IN_TGT (represented graphically with a blue plus symbol) are provided. If a base merge method delivers additional merge states (e.g., if it was able to distinguish an addition of an element in the transformed model from its deletion in the target model), it may be desirable to have additional values in this enumeration.

An Element is the common abstract superclass of model Objs and connections (Cxn). It may include the following methods:

MergeState getMergeState( ): returns the MergeState of the Element, if it has one, null otherwise.

Boolean hasMergeState( ): returns true if the Element has a Merge state, false otherwise.

List<Element> getNeighbors( ): returns the list of Elements that are neighbors of this Element. If the Element is a Cxn, this List will hold the Cxn's source and target Objs (in an arbitrary but fixed order). If the Element is an Obj, this List will be the union of the Obj's inbound and outbound Cxns (in an arbitrary but fixed order).

void delete( ): Removes the element from the model and disconnects it from its neighbors.

Obj is the class used to represent all kinds of model objects (e.g., the "nodes" in our models). Its superclass is Element. In addition to methods inherited from Element methods, it may include the following methods:

List<Cxn> getInboundCxns( ): Returns the list of Cxns that have this Obj as their target object.

List<Cxn> getOutboundCxns( ): Returns the list of Cxns that have this Obj as their source object.

Cxn is the class used to represent relationships between model objects. Its superclass is Element. In addition to methods inherited from Element, it may include the following methods:

Obj getSource( ): Returns the connection's source object or origin.

Obj getTarget( ): Returns the connection's target object or endpoint.

A Model is a container for objects (and indirectly also for the connections between the objects in the model). It may include the following methods:

List<Obj> getAllModelObjs( ): returns a modifiable list of all objects (type Obj) within the model.

List<Element> getAllModelElems( ): returns a list of all model elements (type Element) within the model, e.g., all Objs as they are returned by getAllModelObjs and all Cxns between these Objs.

A Path is a class that represents a (not necessarily directed) path through a model (e.g., a sequence of elements where every 2*i+1th (i=0, 1, ... n) element of a path is an Obj and where every 2*ith element is a Cxn, whose source and target (or target and source if navigating along a connection in inverse direction, respectively) objects are the objects at positions 2*i−1 and 2*i+1, where neighboring connections share a common node). It may include the following methods:

Path (ObjstartNode): constructor of a new path with length 0, starting and ending at the given startNode.

Obj getFirst( ): returns the path's start node.

Obj getLast( ): returns the path's end node.

int length( ): returns the number of connections in the path. If getFirst( )==getLast( ) the length of the path is 0.

Iterator<Element> iterator( ): returns an iterator that will go over all elements on the path, starting with the start node and ending at the end node. The first and every odd element returned will be an Obj, every even element will be a Cxn.

append (Cxn cxn): Appends the given connection to the path. If before the call to append( ), getLast( )==cxn.getSource( ), it will add cxn. getTarget( ) to the path and make it the new last element, if before the call to append( ) getLast( )==cxn.getTarget( ) it will additionally add cxn.getSource( ) to the path and make it the new last element, otherwise the call to append will raise an exception.

prepend (Cxn cxn): Puts the given connection in front of the path. If before the call to append( ) getFirst( )==cxn.getSource( ) it will then place cxn.getTarget( ) in front of the path and that way make it the new first element, if before the call to append( ) getFirst( )==cxn.getTarget( ) it will put cxn.getSource( ) in front of the path and make it the new first element, otherwise the call to prepend will raise an exception.

boolean contains (Element e): Returns true if the given Element e is already part of the path.

The following and/or other helper methods may be provided in certain example embodiments:

Boolean is RelevantCxn (Element e): Returns true if the given Element e is of type Cxn and it is relevant for the consideration of paths. For example, connections from an object to its containing object (e.g., from a task to its containing lane) are not relevant for consideration as part of a path.

Obj getCorrespondingSourceObj (Obj targetObj): Returns for a given merge model Obj its "main" corresponding source model object.

Element getCorrespondingSourceModelElement (Element targetModel-Element): Returns for the given targetModelElement the main corresponding source model element. Internally, this method may use the transformation trace information we discussed above.

Example pseudo-code will now be provided for finding inbound and outbound directed paths and border objects. To obtain all directed paths from an added-in-target object to non-added-in-target Objs reachable solely along added-in-target connections, the following example getBorderPaths method may be used. The example method receives the (added-in-target) object on which path search starts as first parameter start. If the second boolean parameter inbound is set to true, the method will return all inbound paths, otherwise all outbound paths.

```
List<Path> getBorderPaths (Obj start, boolean inbound) {
  List<Path> paths = new List<Path> ( ) ;
  Stack<Path> stack = new Stack<Path> ( ) ;
  stack.push (new Path (start)) ;
  while (!stack.isEmpty( )) {
    currentPath = stack.pop ( ) ;
    Obj currentObj = currentPath.getLast ( ) ;
```

```
    if (getCorrespondingSourceModelElement (currentObj) != null) {
      //an object without corresponding element is added-in-src
      //we found an end node, the current path is completed
      paths.add(currentPath) ;
    } else {
      //obj is not a border obj
      List<Cxn> cxns = inbound ? currentObj.getInboundCxns ( )
                               : currentObj.getOutboundCxns ( ) ;
      for (Cxn cxn : cxns) {
        Obj reachedNode = inbound ? cxn.getSource ( )
                                  : cxn.getTarget( ) ;
        if (    currentPath.contains(reachedNode)
             || !isRelevantCxn(cxn)) {
             continue; //interupt cycle/skip irrelevant cxn
        }
        Path newPath = currentPath.clone ( ) ;
        newPath.append(cxn) ;
        stack.push(newPath);
      }
    }
  }
  return paths;
}
```

The method may proceed by pushing a path of length 0 holding only the start node (e.g., the object that should be propagated) on the top of the stack. It then takes one path after the other from the stack, checking if the path already ends at a border node (e.g., a node that has a corresponding object and is therefore not added-in-target). If the path reached an end node, the path is added to the list of result paths and not considered any further. Otherwise, the (inbound or outbound, depending on the setting of the inbound parameter) connections emanating from the current last element on the path are used to create new paths which are added to the stack. By checking if the node reached via such a connection is already part of the path, cyclic paths are not considered. Although this example implements code with a stack, other example embodiments may implement the same or similar functionality using a queue or the like.

With the inbound paths and paths to the border objects, identifying the corresponding predecessor and successor objects in the merge model may be considered a trivial task, as shown by the following example getTargetModelSuccessors and getTargetModelPredecessors methods:

```
List<Obj> getTargetModelSuccessors(List<Path> outboundPaths) {
  List<Obj> succBorderObjs = new List<Obj> ( ) ;
  for (Path outboundPath : outboundPaths) {
    succBorderObjs.add(outboundPath.getLast( )) ;
  }
  return succBorderObjs;
}
List<Obj> getTargetModelPredecessors(List<Path> inboundPaths) {
  List<Obj> predBorderObjs = new List<Obj> ( ) ;
  for (Path inboundPath : inboundPaths) {
    predBorderObjs.add(inboundPath.getFirst ( )) ;
  }
  return predBorderObjs;
}
```

To obtain the source model objects corresponding to the successor and predecessor merge model objects, it is possible to apply the getCorrespondingSourceModelElement helper method on all target model predecessors or successors, respectively, e.g., using the following pseudo-code snippet:

```
List<Obj> getCorresSrcModelObjs (List<Obj> targetModelObjs) {
  List<Obj> correspObjs = new List<Obj> ( ) ;
  for (Path targetModelObj: targetModelObjs) {
    correspObjs.add((Obj)
        getCorrespondingSourceModelElement (targetModelObj)
    ) ;
  }
  return correspObjs;
}
```

In certain example embodiments of the overall algorithm, the source model border objects are identified within the other steps of the algorithm (e.g., and thus not always as a whole); therefore, this method need not necessarily be included.

The following example pseudo-code may be used in the optional step of deleting border-spanning connections. For instance, if a CPA is performed during a conflict resolution session (e.g., if not all conflicts have been resolved), it is possible to use the following findBorderSpanningCxns method to find all (re)added-in-source connections that directly connect a successor of our propagated object with one of its predecessors (or vice versa):

```
List<Cxn> findBorderSpanningCxns (List<Obj> targetModelPreds,
    List<Obj> targetModelSuccs) {
  List<Cxn> borderSpanningCxns = new List<Cxn> ( ) ;
  for (Obj targetModelPred : targetModelPreds) {
    for (Cxn outbound : targetModelPred.getOutboundCxns( )) {
      if (    outbound.getMergeState( )==MergeState.ADDED_IN_SRC
           && targetModelSuccs.contains(outbound.getTarget( ))) {
        borderSpanningCxns.add(outbound) ;
      }
    }
    for (Cxn inbound : targetModelPred.getInboundCxns( )) {
      if (    inbound.getMergeState( )==MergeState.ADDED_IN_SRC
           && targetModelSuccs.contains(inbound.getSource( ))) {
        borderSpanningCxns.add(inbound) ;
      }
    }
  }
  return borderSpanningCxns;
}
```

For each connection $cxn^{tgt}$ identified by this method, the corresponding source model connection $cxn_{src}$ is identified and $cxn^{tgt}$ and $cxn^{src}$ are deleted, e.g., using the following pseudo-code:

```
void deleteBorderSpanningConnections(List<Obj> targetModelPreds,
    List<Obj> targetModelSuccs) {
  List<Cxn> borderSpanningCxns =
     findBorderSpanningCxns(targetModelPreds, targetModelSuccs) ;
  for (Cxn cxn: borderSpanningCxn) {
    getCorrespondingSourceModelElement(cxn).delete( ) ;
    cxn.delete( ) ;
  }
}
```

Thus, in certain example embodiments, it is possible to remove simple connections that have been replaced with an added-in-target structure.

To create the connections in the source model and in the target model (or remove the merge state from the existing target model connection) for each path, the following example pseudo-code may be used:

```
void createSourceAndTargetModelConnectionsForPaths(List<Path> paths,
    boolean inboundPaths) {
  for (Path path : paths) {
    //get the orientation of the added cxn right:
```

-continued

```
    Obj targetModelCxnStart = inboundPaths ? path.getLast ( )
                                           : path.getFirst ( );
    Obj targetModelCxnEnd = inboundPaths ? path.getFirst ( )
                                         : path.getLast ( );
    if (path.length( )==1) {
        //there must already exist a single connection at pos 1 in
        // our path and it MUST have a merge state of ADDED_IN_TAR-
GET
        //or no merge state. This operation has no effect if
        //the conflict involving this cxn has already been removed
        path.get(1) .setMergeState(null) ;
    } else {
        //for paths of length >1 we create an ADDED_IN_SRC cxn
        //in the target model that "skips" this path, but only if
        //there are unresolved conflicts at the model
        if  (hasRemainingConflicts(targetModelCxnStart.getModel( ))) {
            new Cxn(MergeState.ADDED_IN_SRC,
                targetModelCxnStart,targetModelCxnEnd) ;
        }
        //we create a source model connection for the path
        new Cxn (getCorrespondingSourceModelObject (targetModelCxn-
Start),
            getCorrespondingSourceModelObject(targetModelCxnEnd));
    }
}
```

To perform a complete reconnecting of a propagated added-in-target object propagatedObj, the above-described and/or other methods discussed above may be grouped together in the following example reconnectPropagatedObject method:

```
void reconnectPropagatedObject (Obj propagatedObj) {
    List<Path> outbPaths = getBorderPaths(propagatedObj, false) ;
    List<Path> inbPaths = getBorderPaths(propagatedObj, true) ;
    List<Obj> targetModelSuccObjs =
        getTargetModelSuccessors(outbPaths) ;
    List<Obj> targetModelPredObjs =
        getTargetModelPredecessors(inbPaths) ;
    deleteBorderSpanningConnections(targetModelPredObjs,
        targetModelSuccObjs) ;
    createSourceAndTargetModelConnectionsForPaths(outbPaths, false) ;
    createSourceAndTargetModelConnectionsForPaths(inbPaths, true) ;
}
```

It will be appreciated that the transformation pattern(s) or rule(s) in certain example embodiments may correspond to instructions for creating the first model from the second model, the instructions being any suitable combination of exemplary patterns, manual translation steps, hard-coded imperatives, and/or the like.

Although certain example embodiments have used BPMN and EPC as example models, other example embodiments may use these and/or other models such as, for example, UML, entity relationship, and/or other models. In such cases, it may be necessary or desirable to update the connecting algorithm, e.g., to account for differences between the models and/or specify details regarding what constitutes a connection in the model and how such connections are to be handled. For example, it may be desirable to modify the example connection algorithm described herein to implement a set of rules regarding "associations," cardinality, directed vs. undirected graphs, etc.

Although certain example embodiments have been described as involving additions, modifications, and/or deletions relative to abstract tasks, manual tasks, and service tasks, the example techniques herein may be applied to any BPMN element. This list may include, for example, task elements such as abstract tasks, business rule tasks, manual tasks, receive tasks, script tasks, sent tasks, service tasks, user tasks, etc. It also may include event elements such as, for example, start, intermediate, and/or end event elements (including, for instance, conditional start events, message start events, partial multiple start events, signal start events, timer start events, intermediate events, compensation intermediate events, conditional intermediate events, escalation intermediate events, link intermediate events, message intermediate events, multiple intermediate events, parallel multiple intermediate events, signal intermediate events, to be caught and/or thrown, end events, compensation end events, error end events, escalation events, message end events, multiple end events, signal end events, terminate end events, and/or the like). This list may also include gateway elements (such as, for example, gateways, complex gateways, event-based gateways, exclusive gateways, inclusive gateways, instantiating event-based gateways, instantiating parallel event-based gateways, parallel gateways, and/or the like. It will be appreciated that other corresponding or non-corresponding elements may be used in connection with example embodiments that involve non-BPMN models.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of propagating changes made in a first computer-represented model to a second computer-represented model, the method comprising:
   receiving input corresponding to at least one change to the first model, the at least one change indicating that at least one object in the first model has been added, modified, and/or deleted;
   receiving an instruction to propagate the at least one change made to the first model to the second model;
   executing, via at least one processor, at least one corresponding change propagation action (CPA) to cause the at least one change made to the first model to be propagated to the second model in whole or in part as appropriate in achieving consistency between the first and second models following said executing, the at least one CPA including instructions that, when executed, perform functionality comprising:
      determining whether the at least one change propagation action can be applied for the at least one change, and when it is determined that the at least one change propagation action can be applied for the change, linking the at least one object to at least one other object in the second model,
   wherein each said CPA corresponds to one or more corresponding transformation patterns or rules and includes program logic executable by the at least one processor to carry out the respective transformation pattern(s) or rule(s) in inverse direction(s), wherein the first model is a technical-oriented model and the second model is a corresponding business-oriented model, or vice versa, and wherein said linking includes, for an object added in the first model;
- (a) creating one or more corresponding elements in the second model;
- (b) searching for border objects adjacent to the object added in the first model that do not have a merge state conflict;
- (c) for each border object in the first model, identifying a corresponding border object in the second model; and
- (d) for each path from the object added in the first model to a border object in the first model;
  - when there are one or more objects along the path, adding a direct connection from the object added in the first model to the respective border object, setting a merge state of the direct connection to indicate that it was added in the first model, and creating one or more corresponding connections in the second model;
  - and otherwise; removing an added in target merge state from the existing single connection and adding one or more corresponding connections in the second model.

2. The method of claim 1, wherein the first model is a technical model of a process and/or business requirement, and wherein the second model is a business-oriented model of the process and/or business requirement.

3. The method of claim 1, wherein the searching includes traversing the first model along directed paths.

4. The method of claim 1, wherein connections in the first model are not adjusted and connections in the second model are not created prior to (d).

5. The method of claim 1, further comprising prior to (d):
removing any group of objects in the first model that connects between two or more border object in the first model; and
identifying and deleting corresponding structures in the second model.

6. The method of claim 1, wherein both the adding of the direct connection from the object added in the first model to the respective border object, and the setting the merge state of the direct connection to indicate that it was added in the first model, are performed during conflict resolution.

7. The method of claim 1, further comprising establishing trace information for each element in the first model involved in the propagation.

8. The method of claim 7, wherein the trace information includes, for each element in a transformed model, information about transformation rule(s) involved in, and/or source element(s) responsible for, its creation.

9. The method of claim 1, wherein said linking further comprises creating trace information to establish a correspondence between the at least one object in the first model and the at least one other object in the second model.

10. The method of claim 1, wherein the determining of whether the at least one change propagation action can be applied for the at least one change includes plural enablement checks.

11. The method of claim 1, further comprising when it is determined that the at least one change propagation action cannot be applied for the change, returning a list of one or more reasons relating to why the CPA cannot be applied.

12. The method of claim 1, wherein a plurality of objects are added, changed, and/or deleted via a plurality of CPAs.

13. The method of claim 12, wherein the linking is deterministic such that the same resultant model is obtained regardless of the order in which the CPAs are executed.

14. The method of claim 1, wherein the first model is modeled in accordance with the BPMN model and/or the second model is modeled in accordance with the EPC model.

15. The method of claim 1, wherein a plurality of CPAs are provided for propagating additions of, modifications to, and/or deletions of BPMN elements.

16. The method of claim 1, wherein the BPMN elements that can be added, modified, and/or deleted include abstract tasks, manual tasks, or service tasks.

17. The method of claim 1, wherein the transformation pattern(s) or rule(s) correspond to instructions for creating the first model from the second model, the instructions being any suitable combination of exemplary patterns, manual translation steps, or hard-coded imperatives.

18. A non-transitory computer readable storage medium tangibly storing instructions that, when executed by at least one processor of a computer modeling system, propagate changes made in a first computer-represented model to a second computer-represented model, by at least:
receiving input corresponding to at least one change to the first model, the at least one change indicating that at least one object in the first model has been added, modified, and/or deleted;
receiving an instruction to propagate the at least one change made to the first model to the second model;
executing, via at least one processor, at least one corresponding change propagation action (CPA) to cause the at least one change made to the first model to be propagated to the second model in whole or in part as appropriate in achieving consistency between the first and second models following said executing, the at least one CPA including instructions that, when executed, perform functionality comprising:
determining whether the at least one change propagation action can be applied for the at least one change, and
when it is determined that the at least one change propagation action can be applied for the change, linking the at least one object to at least one other object in the second model,
wherein each said CPA corresponds to one or more corresponding transformation patterns or rules and includes program logic executable by the at least one processor to carry out the respective transformation pattern(s) or rule(s) in inverse direction(s),
wherein the first model is a technical-oriented model and the second model is a corresponding business-oriented model, or vice versa, and
wherein said linking includes, for an object added in the first model:
- (a) creating one or more corresponding elements in the second model;
- (b) searching for border objects adjacent to the object added in the first model that do not have a merge state conflict;
- (c) for each border object in the first model, identifying a corresponding border object in the second model; and
- (d) for each path from the object added in the first model to a border object in the first model:

when there are one or more objects along the path,
adding a direct connection from the object added in the first model to the respective border object,
setting a merge state of the direct connection to indicate that it was added in the first model, and
creating one or more corresponding connections in the second model;
and otherwise; removing an added in target merge state from the existing single connection and adding one or more corresponding connections in the second model.

19. A modeling system configured to enable a user to propagate changes made in a first computer-represented model to a second computer-represented model, the system comprising processing resources include at least one processor and a memory, the processing resources being programmed to at least:
accept input corresponding to at least one user-specified change to the first model, the at least one change indicating that at least one object in the first model has been added, modified, and/or deleted;
receive an instruction to propagate the at least one change made to the first model to the second model; and
execute at least one program logic bundle, selected from a group of executable program logic bundles, in order to selectively cause some or all alterations associated with the at least one change made to the first model to be propagated to the second model so that the first and second models become consistent with one another at least in one or more area(s) affected by the propagation, the at least one program logic bundle being programmed to:
determine whether the at least one program logic bundle can be applied for the at least one change, and
when it is determined that the at least one program logic bundle can be applied for the change, link the at least one object to at least one other object in the second model,
wherein each program logic bundle corresponds to at least one respective transformation pattern or rule to be selectively applied in inverse direction(s) upon execution,
wherein the first model is a target of a transformation and a source of a propagation, and wherein the second model is a source of the transformation and a target of the propagation, and
wherein the processing resources are configured to link the at least one object to the at least one other object in the second model by executing instructions that include:
(a) creating an element in the second model that corresponds to an object to be added in the first model;
(b) searching for border objects adjacent to the object added in the first model that do not have a merge state conflict;
(c) for each border object in the first model, identifying a corresponding border object in the second model; and
(d) for each path from the object added in the first model to a border object in the first model;
when there are one or more objects along the path,
adding a direct connection from the object added in the first model to the respective border object,
setting a merge state of the direct connection to indicate that it was added in the second model, and
creating a corresponding connection in the second model;
and otherwise: removing an added in target merge state from the existing single connection and adding a corresponding connection in the second model.

20. The system of claim 19, wherein the processing resources are configured to traverse the first model along directed paths.

21. The system of claim 19, wherein connections in the first model are not adjusted and connections in the second model are not created prior to (d).

22. The system of claim 19, wherein the processing resources are configured to, prior to (d):
remove any group of objects in the first model that connects between two or more border object in the first model; and
identify and delete corresponding structures in the second model.

23. The system of claim 19, wherein the determining of whether the at least one program logic bundle can be applied for the at least one change includes plural enablement checks.

24. The system of claim 19, further comprising a user interface, and through which a user is presented with a list of one or more reasons relating to why a program logic bundle cannot be applied when it is determined that that program logic bundle cannot be applied.

25. The system of claim 24, wherein the user interface is configured to accept user input specifying how a problem preventing a program logic bundle from being applied is to be resolved.

26. The system of claim 19, wherein a plurality of objects are added, changed, and/or deleted via a plurality of program logic bundles.

27. The system of claim 26, wherein processing resources are configured to execute a deterministic algorithm in performing the linking such that the same resultant model is obtained regardless of the order in which the program logic bundles are executed.

28. A method for selectively propagating changes made in a first computer-represented model to a second computer-represented model across a modeling system comprising processing resources including at least one processor, the method comprising:
receiving an instruction to propagate at least one change made to the first model to the second model, the change corresponding to an object being added in the first model; and
executing, via at least one processor, at least one corresponding change propagation action (CPA) to cause the at least one change made to the first model to be propagated to the second model, wherein the at least on corresponding CPA is practiced by:
performing an enablement check to determine whether the at least one CPA can be applied for the at least one change, and
when the enablement check indicates that the at least one CPA can be applied for the change, connecting the at least one object to at least one other object in the second model,
wherein the connecting is practiced, in connection with the processing resources, by at least:
(a) finding first model side border elements of the first model object that is being propagated $o^{1st}$, including:
(i) storing all outbound directed paths that start at $o^{1st}$ and follow added-in-first-model connections to a list of outbound paths, $path^{out} = \{path^{out}_1, \ldots, path^{out}_n\}$, (ii) defining a multiset of end objects for the outbound paths $succ^{1st}=\{s^{1st}_1, \ldots, s^{1st}_n\}$, the multiset being first model successors to $o^{1st}$, (iii) storing all inbound directed paths that start at $o^{1st}$ and follow added-in-first-model connections (in an inverse direction) to a list of inbound paths, $path^{in}=\{path^{in}_1, \ldots, path^{in}_m\}$, (iv) defining a multiset of start objects for the inbound paths $pred^{1st}=\{p^{1st}_1, \ldots, p^{1st}_n\}$, this multiset being first model predecessors to $o^{1st}$, and (v) defining the union of the first model predecessors and successors $succ^{1st} \cup pred^{1st}=border^{1st}$, this union being the set of first model border objects;

(b) using trace information to find elements in the second model corresponding to the first model predecessors $pred^{2nd}=\{p^{2nd}_1, \ldots, p^{2nd}_n\}$ and successors $succ^{2nd}=\{s^{2nd}_1, \ldots, s^{2nd}_n\}$, and (c) for each $p^{2nd}_i \in pred^{2nd}$ (or each $s^{2nd}_k \in succ^{2nd}$):

(i) creating a connection from $p^{2nd}_i$ to $o^{2nd}$ (or from $o^{2nd}$ to $S^{2nd}_k$) in the second model, wherein $o^{2nd}$ is the second model counterpart to $o^{1st}$.

29. The method of claim of claim 28, wherein (c) further comprises:

(ii) if a length of the path $path^{in}_i$,length($path^{in}_i$) ($path^{out}_k$,length($path^{out}_k$)) corresponding to $p^{2nd}_i(s^{2nd}_k)$ is 1: removing an added-in-first-model merge state of this path's single connection in the first model, and otherwise creating a connection from $p^{1st}_i$ to $o^{1st}$ (or from $o^{1st}$ to $s^{1st}_k$) in the first model and setting a merge state thereof to added-in-second-model.

30. The method of claim 29, further comprising between (b) and (c), determining whether the corresponding CPA is performed during conflict resolution and, if so, for every pair $(p^{1st}_i, s^{1st}_k)$ with $p^{1st}_i \in pred^{1st}$ and $s^{1st}_k \in succ^{1st}$ for which there exists a connection $cxn^{1st}$ from $p^{1st}_i$ to $s^{1st}_k$ (or from $^{1st}_k$ to $p^{1st}_i$) whose merge state is added-in-second-model, deleting this connection $cxn^{1st}$ and deleting $cxn^{1st}$'s corresponding connection $cxn^{2nd}$ in the second model from $p^{2nd}_i$ to $s^{2nd}_k$ (or from $s^{2nd}_k$ to $p^{2nd}_i$) in the second model.

31. The method of claim 29, wherein (c)(i) and (c)(ii) are performed only when a change propagation is being performed while there is still a pending merge conflict.

32. The method of claim 29, wherein (c)(i) and (c)(ii) are performed only when a change propagation is being performed while there is still a pending merge conflict on the change to be propagated.

33. The method of claim 28, wherein the first model is an original target of the transformation and a source of propagation, and wherein the second model is an original source of the transformation and a target of the propagation.

34. The non-transitory computer readable storage medium of claim 18, wherein the searching includes traversing the first model along directed paths.

35. The non-transitory computer readable storage medium of claim 18, wherein connections in the first model are not adjusted and connections in the second model are not created prior to (d).

36. The non-transitory computer readable storage medium of claim 18, wherein further instructions are provided for at least, prior to (d):
removing any group of objects in the first model that connects between two or more border object in the first model; and
identifying and deleting corresponding structures in the second model.

37. The non-transitory computer readable storage medium of claim 18, wherein both the adding of the direct connection from the object added in the first model to the respective border object, and the setting the merge state of the direct connection to indicate that it was added in the first model, are performed during conflict resolution.

38. The non-transitory computer readable storage medium of claim 18, wherein further instructions are provided for at least establishing trace information for each element in the first model involved in the propagation, wherein the trace information includes, for each element in a transformed model, information about transformation rule(s) involved in, and/or source element(s) responsible for, its creation.

39. The non-transitory computer readable storage medium of claim 18, wherein the determining of whether the at least one change propagation action can be applied for the at least one change includes plural enablement checks.

40. The non-transitory computer readable storage medium of claim 18, wherein further instructions are provided for at least, when it is determined that the at least one change propagation action cannot be applied for the change, returning a list of one or more reasons relating to why the CPA cannot be applied.

41. The non-transitory computer readable storage medium of claim 18, wherein a plurality of objects are added, changed, and/or deleted via a plurality of CPAs.

42. The non-transitory computer readable storage medium of claim 18, wherein the linking is deterministic such that the same resultant model is obtained regardless of the order in which the CPAs are executed.

43. The non-transitory computer readable storage medium of claim 18, wherein the transformation pattern(s) or rule(s) correspond to instructions for creating the first model from the second model, the instructions being any suitable combination of exemplary patterns, manual translation steps, or hard-coded imperatives.

* * * * *